US012627405B2

(12) United States Patent
Sato et al.

(10) Patent No.: US 12,627,405 B2
(45) Date of Patent: May 12, 2026

(54) REDUNDANCY CONTROL DEVICE, REDUNDANCY CONTROL METHOD, AND REDUNDANCY CONTROL PROGRAM

(71) Applicant: Hitachi, Ltd., Tokyo (JP)

(72) Inventors: Katsuto Sato, Tokyo (JP); Takafumi Kikuchi, Tokyo (JP); Takeru Chiba, Tokyo (JP)

(73) Assignee: Hitachi Vantara, LTD., Kanagawa-Ken (JP)

( * ) Notice: Subject to any disclaimer, the term of this patent is extended or adjusted under 35 U.S.C. 154(b) by 90 days.

(21) Appl. No.: 18/606,184

(22) Filed: Mar. 15, 2024

(65) Prior Publication Data

US 2025/0175381 A1 May 29, 2025

(30) Foreign Application Priority Data

Nov. 24, 2023 (JP) ................................. 2023-199138

(51) Int. Cl.
*H04L 1/08* (2006.01)
*H04L 45/243* (2022.01)
(Continued)

(52) U.S. Cl.
CPC .............. *H04L 1/08* (2013.01); *H04L 45/243* (2022.05); *H04L 67/61* (2022.05); *H04L 1/0001* (2013.01); *H04L 41/5025* (2013.01)

(58) Field of Classification Search
CPC ... H04L 1/0001; H04L 1/0002; H04L 1/0009; H04L 1/004; H04L 1/08; H04L 41/5025;
(Continued)

(56) References Cited

U.S. PATENT DOCUMENTS 7,539,745 B1 * 5/2009 Wang ...................... H04L 47/70
709/224
2007/0106813 A1 * 5/2007 Bordes ............... H04N 21/2662
375/E7.002
(Continued)

FOREIGN PATENT DOCUMENTS

CN 116419017 A * 7/2023 ......... H04N 21/2402
JP 2015-122697 A 7/2015
(Continued)

OTHER PUBLICATIONS

Hunger, Axel, Pascal A. Klein, and Martin H. Verbunt. "Evaluation of the redundancy-bandwidth trade-off and jitter compensation in rMPTCP." 2016 8th IFIP International Conference on New Technologies, Mobility and Security (NTMS). IEEE, 2016. (Year: 2016).*
(Continued)

*Primary Examiner* — Vivek C Srivastava
*Assistant Examiner* — William C McBeth
(74) *Attorney, Agent, or Firm* — Volpe Koenig

(57) ABSTRACT

A redundancy of communication in a communication system can be appropriately set. A configuration is provided in which in a server for setting a redundancy for a communication system allowing communication via a network according to a set redundancy, a processor is provided, and the processor is configured to receive, from an application, a use-predicted communication bandwidth which is a communication bandwidth predicted to be used in the network, determine a redundancy limit which is an upper limit of a redundancy in communication by the application based on a communication bandwidth usable in the network and the use-predicted communication bandwidth, and set, in the communication system, a redundancy equal to or less than the determined redundancy limit as the redundancy in the communication by the application.

6 Claims, 31 Drawing Sheets

(51) Int. Cl.
| | | |
|---|---|---|
| *H04L 67/61* | (2022.01) | |
| *H04L 1/00* | (2006.01) | |
| *H04L 41/5025* | (2022.01) | |

(58) Field of Classification Search
CPC ....... H04L 45/24; H04L 45/243; H04L 65/75; H04L 65/752; H04L 65/80; H04L 67/50; H04L 67/60; H04L 67/61; H04L 67/63; H04L 69/14; H04M 13/35; H04M 13/353; H04M 13/356; H04N 21/24; H04N 21/2402; H03M 13/35; H03M 13/353; H03M 13/356
See application file for complete search history.

(56) References Cited

U.S. PATENT DOCUMENTS

| | | | | |
|---|---|---|---|---|
| 2008/0134005 | A1* | 6/2008 | Izzat | H04L 1/0009 714/776 |
| 2014/0269893 | A1* | 9/2014 | Parikh | H04L 1/08 375/240 |
| 2015/0169396 | A1* | 6/2015 | Tsyganok | H04L 1/0009 714/704 |
| 2016/0127215 | A1* | 5/2016 | Mani | H04L 1/0002 370/252 |
| 2016/0205586 | A1* | 7/2016 | Kim | H04L 1/0011 370/230 |
| 2021/0297359 | A1* | 9/2021 | Banerjee | H04L 45/24 |
| 2021/0400561 | A1* | 12/2021 | Ginthoer | H04L 45/24 |
| 2022/0059101 | A1* | 2/2022 | Liang | H04L 1/0009 |
| 2023/0006905 | A1 | 1/2023 | Nakata | |
| 2023/0045761 | A1* | 2/2023 | Pollack | H04L 1/0009 |
| 2024/0356686 | A1* | 10/2024 | Pang | H04L 45/24 |

FOREIGN PATENT DOCUMENTS

| | | |
|---|---|---|
| JP | 2023-006210 A | 1/2023 |
| JP | 2023-039257 A | 3/2023 |

OTHER PUBLICATIONS

Ford., A., et al., "TCP Extensions for Multipath Operation with Multiple Addresses," Internet Engineering Task Force (IETF), RFC 8684, Mar. 2020, 68 pgs.

* cited by examiner

*FIG. 2*

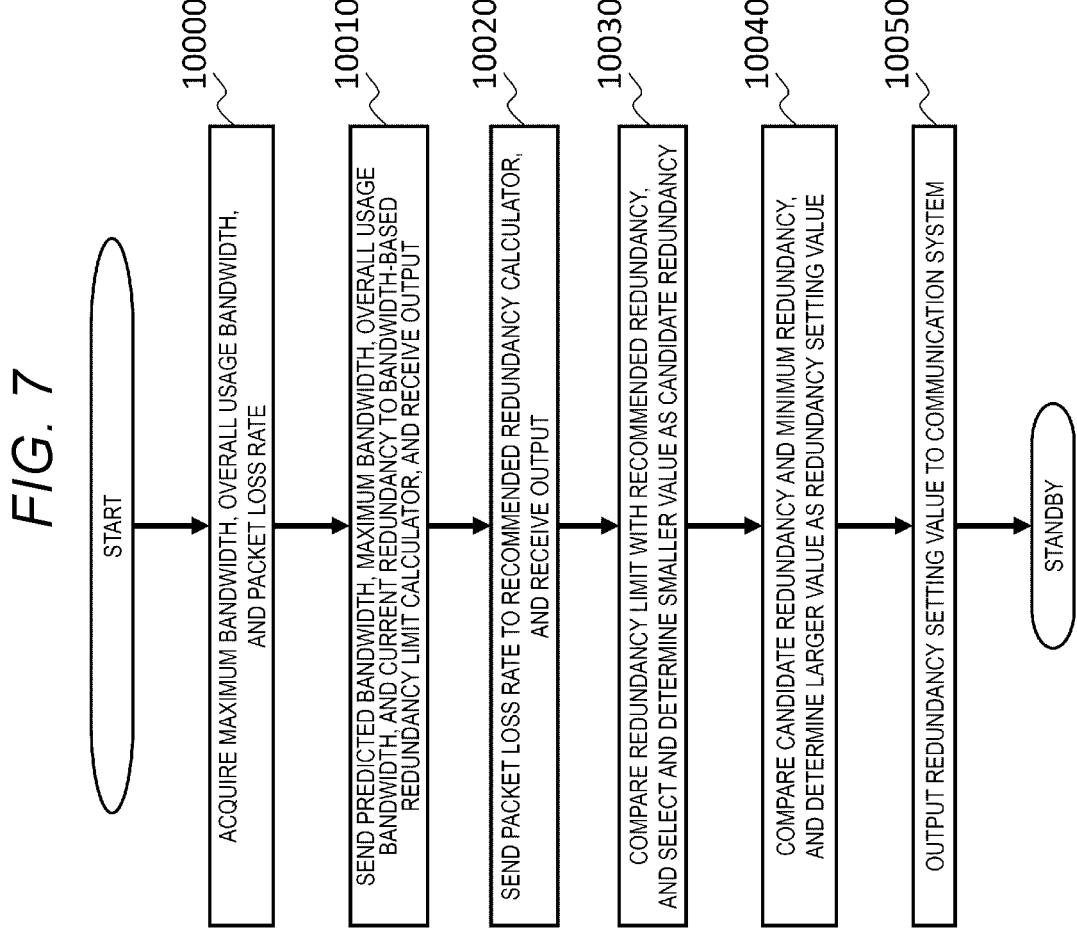

*FIG. 7*

START

10000 — ACQUIRE MAXIMUM BANDWIDTH, OVERALL USAGE BANDWIDTH, AND PACKET LOSS RATE

10010 — SEND PREDICTED BANDWIDTH, MAXIMUM BANDWIDTH, OVERALL USAGE BANDWIDTH, AND CURRENT REDUNDANCY TO BANDWIDTH-BASED REDUNDANCY LIMIT CALCULATOR, AND RECEIVE OUTPUT

10020 — SEND PACKET LOSS RATE TO RECOMMENDED REDUNDANCY CALCULATOR, AND RECEIVE OUTPUT

10030 — COMPARE REDUNDANCY LIMIT WITH RECOMMENDED REDUNDANCY, AND SELECT AND DETERMINE SMALLER VALUE AS CANDIDATE REDUNDANCY

10040 — COMPARE CANDIDATE REDUNDANCY AND MINIMUM REDUNDANCY, AND DETERMINE LARGER VALUE AS REDUNDANCY SETTING VALUE

10050 — OUTPUT REDUNDANCY SETTING VALUE TO COMMUNICATION SYSTEM

STANDBY

FIG. 9

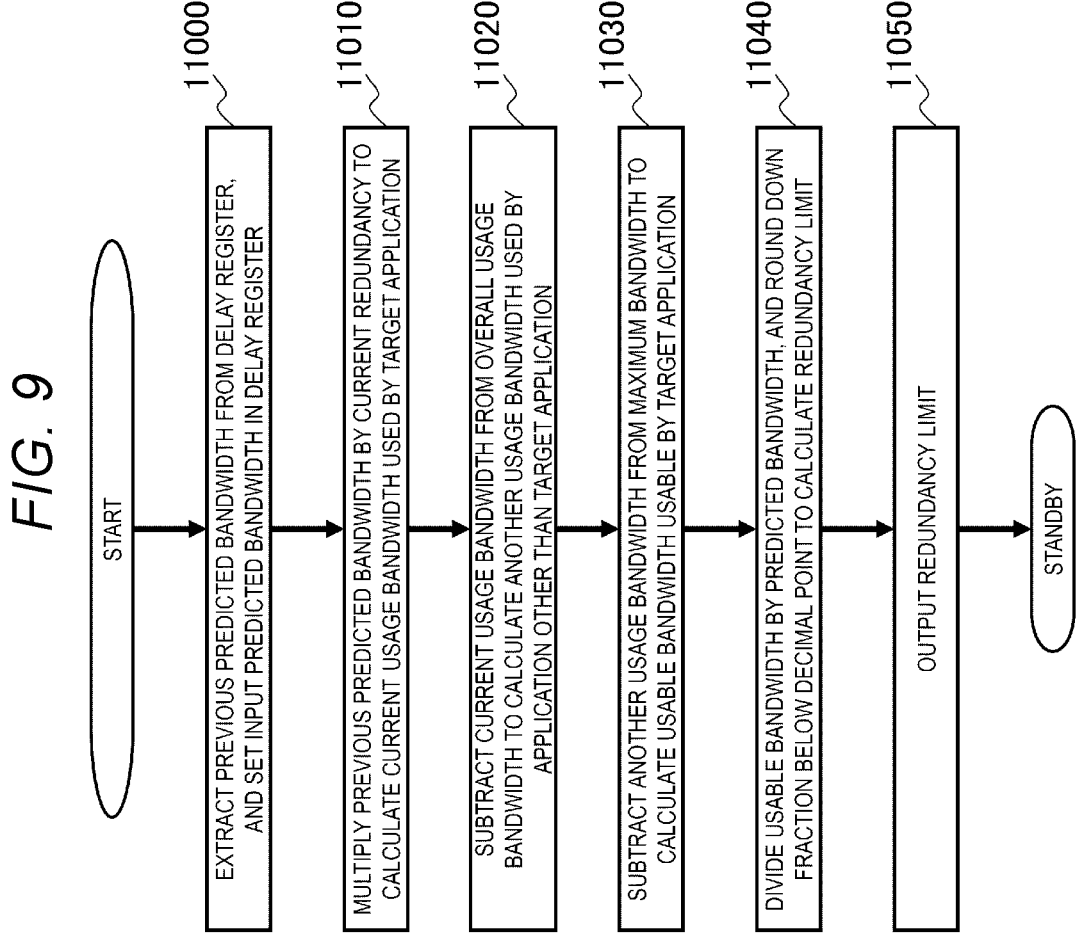

START

11000
EXTRACT PREVIOUS PREDICTED BANDWIDTH FROM DELAY REGISTER, AND SET INPUT PREDICTED BANDWIDTH IN DELAY REGISTER

11010
MULTIPLY PREVIOUS PREDICTED BANDWIDTH BY CURRENT REDUNDANCY TO CALCULATE CURRENT USAGE BANDWIDTH USED BY TARGET APPLICATION

11020
SUBTRACT CURRENT USAGE BANDWIDTH FROM OVERALL USAGE BANDWIDTH TO CALCULATE ANOTHER USAGE BANDWIDTH USED BY APPLICATION OTHER THAN TARGET APPLICATION

11030
SUBTRACT ANOTHER USAGE BANDWIDTH FROM MAXIMUM BANDWIDTH TO CALCULATE USABLE BANDWIDTH USABLE BY TARGET APPLICATION

11040
DIVIDE USABLE BANDWIDTH BY PREDICTED BANDWIDTH, AND ROUND DOWN FRACTION BELOW DECIMAL POINT TO CALCULATE REDUNDANCY LIMIT

11050
OUTPUT REDUNDANCY LIMIT

STANDBY

FIG. 10

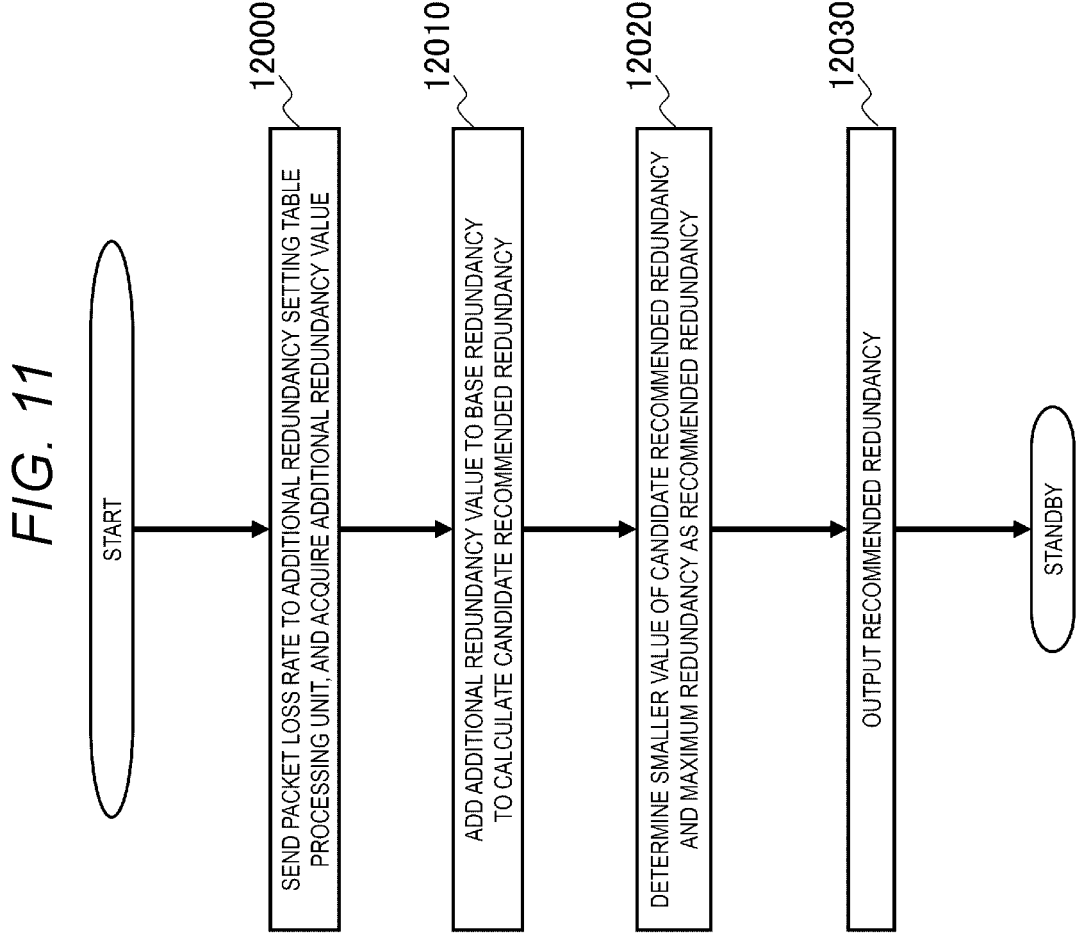

*FIG. 11*

START

12000 — SEND PACKET LOSS RATE TO ADDITIONAL REDUNDANCY SETTING TABLE PROCESSING UNIT, AND ACQUIRE ADDITIONAL REDUNDANCY VALUE

12010 — ADD ADDITIONAL REDUNDANCY VALUE TO BASE REDUNDANCY TO CALCULATE CANDIDATE RECOMMENDED REDUNDANCY

12020 — DETERMINE SMALLER VALUE OF CANDIDATE RECOMMENDED REDUNDANCY AND MAXIMUM REDUNDANCY AS RECOMMENDED REDUNDANCY

12030 — OUTPUT RECOMMENDED REDUNDANCY

STANDBY

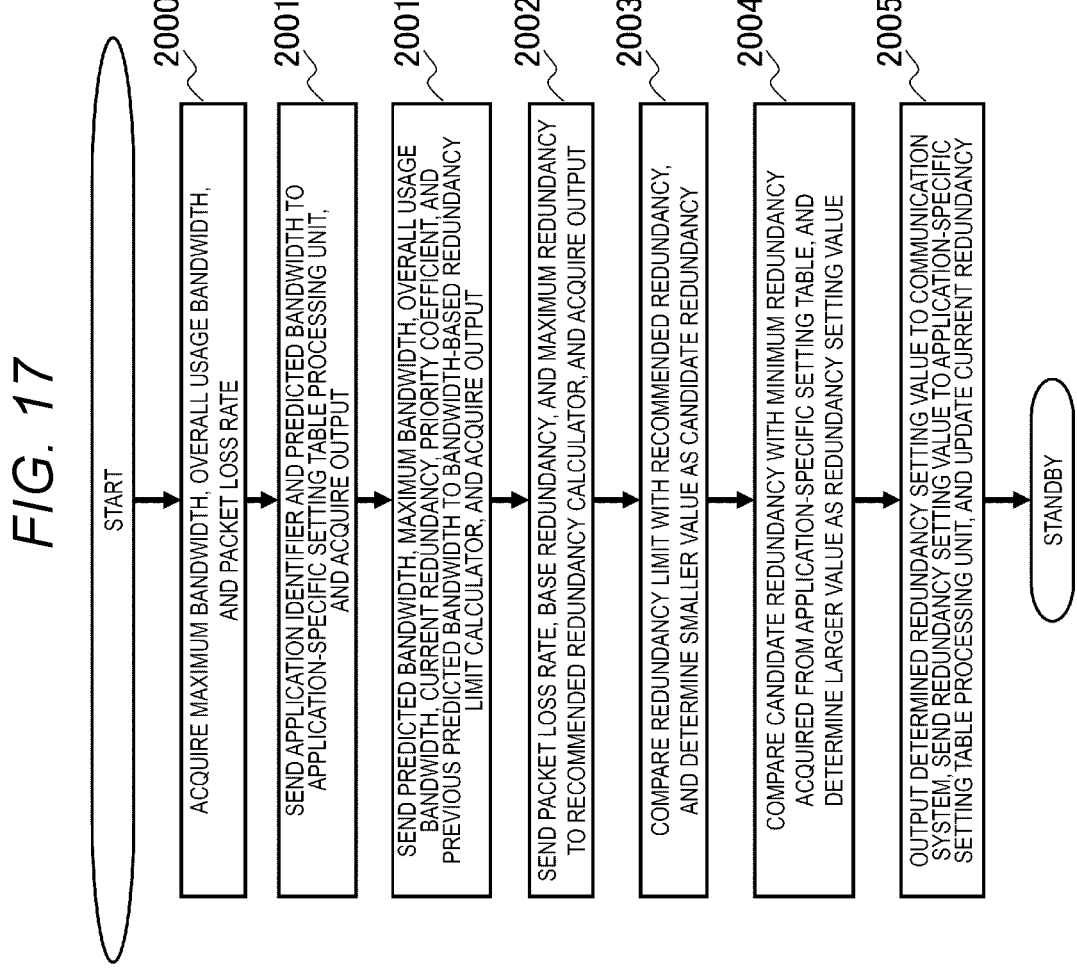

START

20000 — ACQUIRE MAXIMUM BANDWIDTH, OVERALL USAGE BANDWIDTH, AND PACKET LOSS RATE

20010 — SEND APPLICATION IDENTIFIER AND PREDICTED BANDWIDTH TO APPLICATION-SPECIFIC SETTING TABLE PROCESSING UNIT, AND ACQUIRE OUTPUT

20015 — SEND PREDICTED BANDWIDTH, MAXIMUM BANDWIDTH, OVERALL USAGE BANDWIDTH, CURRENT REDUNDANCY, PRIORITY COEFFICIENT, AND PREVIOUS PREDICTED BANDWIDTH TO BANDWIDTH-BASED REDUNDANCY LIMIT CALCULATOR, AND ACQUIRE OUTPUT

20020 — SEND PACKET LOSS RATE, BASE REDUNDANCY, AND MAXIMUM REDUNDANCY TO RECOMMENDED REDUNDANCY CALCULATOR, AND ACQUIRE OUTPUT

20030 — COMPARE REDUNDANCY LIMIT WITH RECOMMENDED REDUNDANCY, AND DETERMINE SMALLER VALUE AS CANDIDATE REDUNDANCY

20040 — COMPARE CANDIDATE REDUNDANCY WITH MINIMUM REDUNDANCY ACQUIRED FROM APPLICATION-SPECIFIC SETTING TABLE, AND DETERMINE LARGER VALUE AS REDUNDANCY SETTING VALUE

20050 — OUTPUT DETERMINED REDUNDANCY SETTING VALUE TO COMMUNICATION SYSTEM, SEND REDUNDANCY SETTING VALUE TO APPLICATION-SPECIFIC SETTING TABLE PROCESSING UNIT, AND UPDATE CURRENT REDUNDANCY

STANDBY

FIG. 18

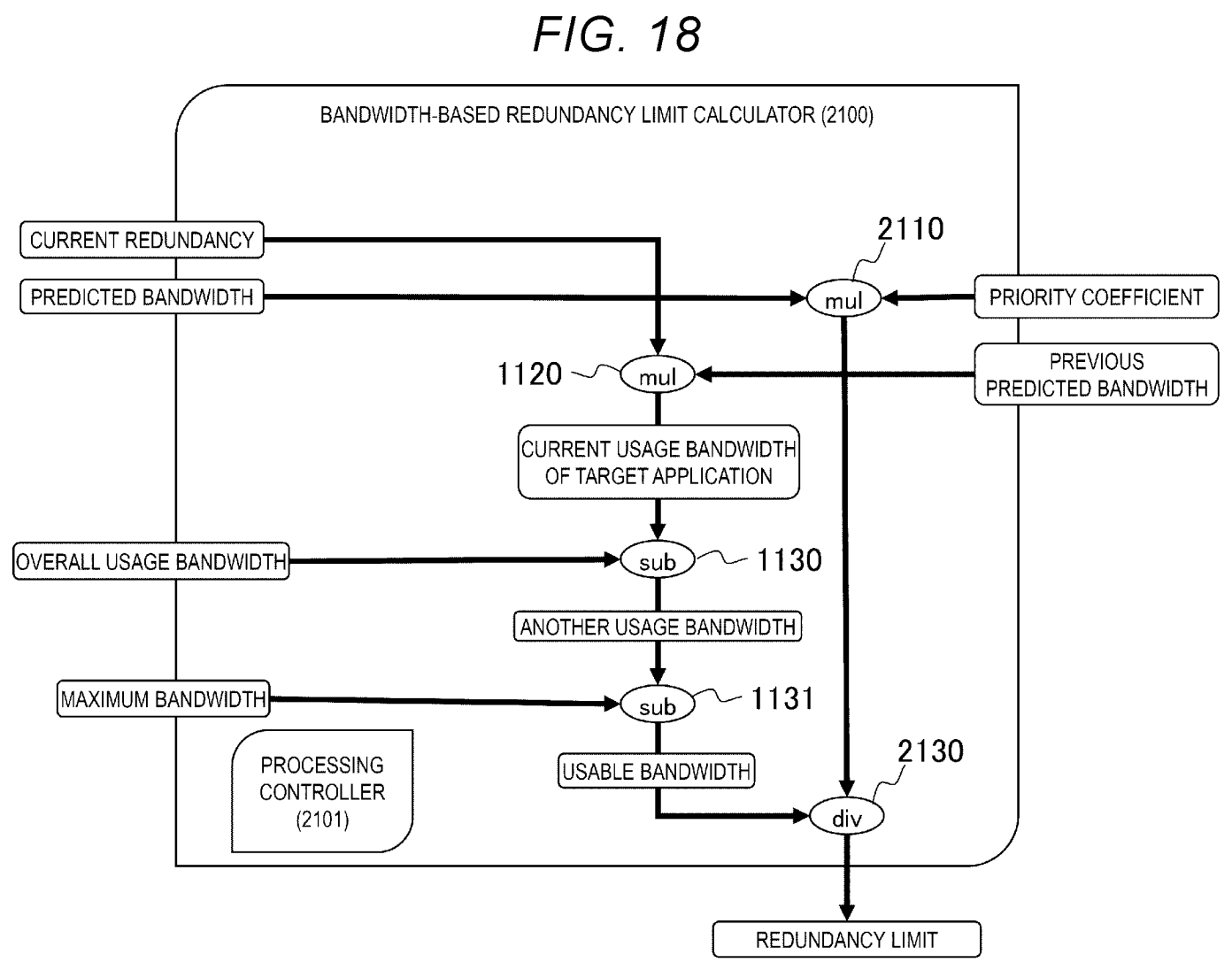

BANDWIDTH-BASED REDUNDANCY LIMIT CALCULATOR (2100)

PRIORITY COEFFICIENT

PREVIOUS PREDICTED BANDWIDTH

2110 mul

CURRENT REDUNDANCY

PREDICTED BANDWIDTH

1120 mul

CURRENT USAGE BANDWIDTH OF TARGET APPLICATION

1130 sub

ANOTHER USAGE BANDWIDTH

1131 sub

USABLE BANDWIDTH

2130 div

REDUNDANCY LIMIT

OVERALL USAGE BANDWIDTH

MAXIMUM BANDWIDTH

PROCESSING CONTROLLER (2101)

*FIG. 19*

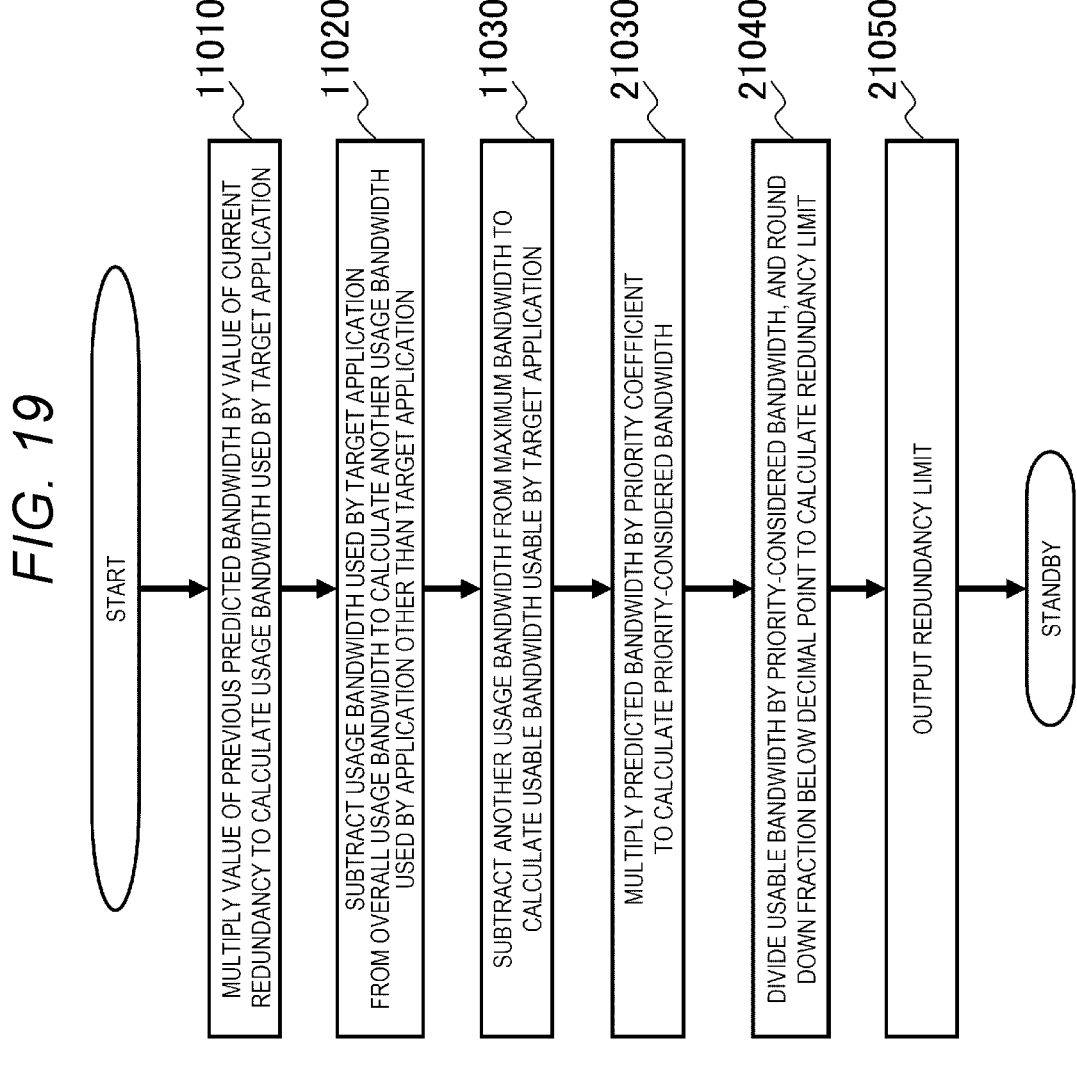

START

11010 — MULTIPLY VALUE OF PREVIOUS PREDICTED BANDWIDTH BY VALUE OF CURRENT REDUNDANCY TO CALCULATE USAGE BANDWIDTH USED BY TARGET APPLICATION

11020 — SUBTRACT USAGE BANDWIDTH USED BY TARGET APPLICATION FROM OVERALL USAGE BANDWIDTH TO CALCULATE ANOTHER USAGE BANDWIDTH USED BY APPLICATION OTHER THAN TARGET APPLICATION

11030 — SUBTRACT ANOTHER USAGE BANDWIDTH FROM MAXIMUM BANDWIDTH TO CALCULATE USABLE BANDWIDTH USABLE BY TARGET APPLICATION

21030 — MULTIPLY PREDICTED BANDWIDTH BY PRIORITY COEFFICIENT TO CALCULATE PRIORITY-CONSIDERED BANDWIDTH

21040 — DIVIDE USABLE BANDWIDTH BY PRIORITY-CONSIDERED BANDWIDTH, AND ROUND DOWN FRACTION BELOW DECIMAL POINT TO CALCULATE REDUNDANCY LIMIT

21050 — OUTPUT REDUNDANCY LIMIT

STANDBY

*FIG. 21*

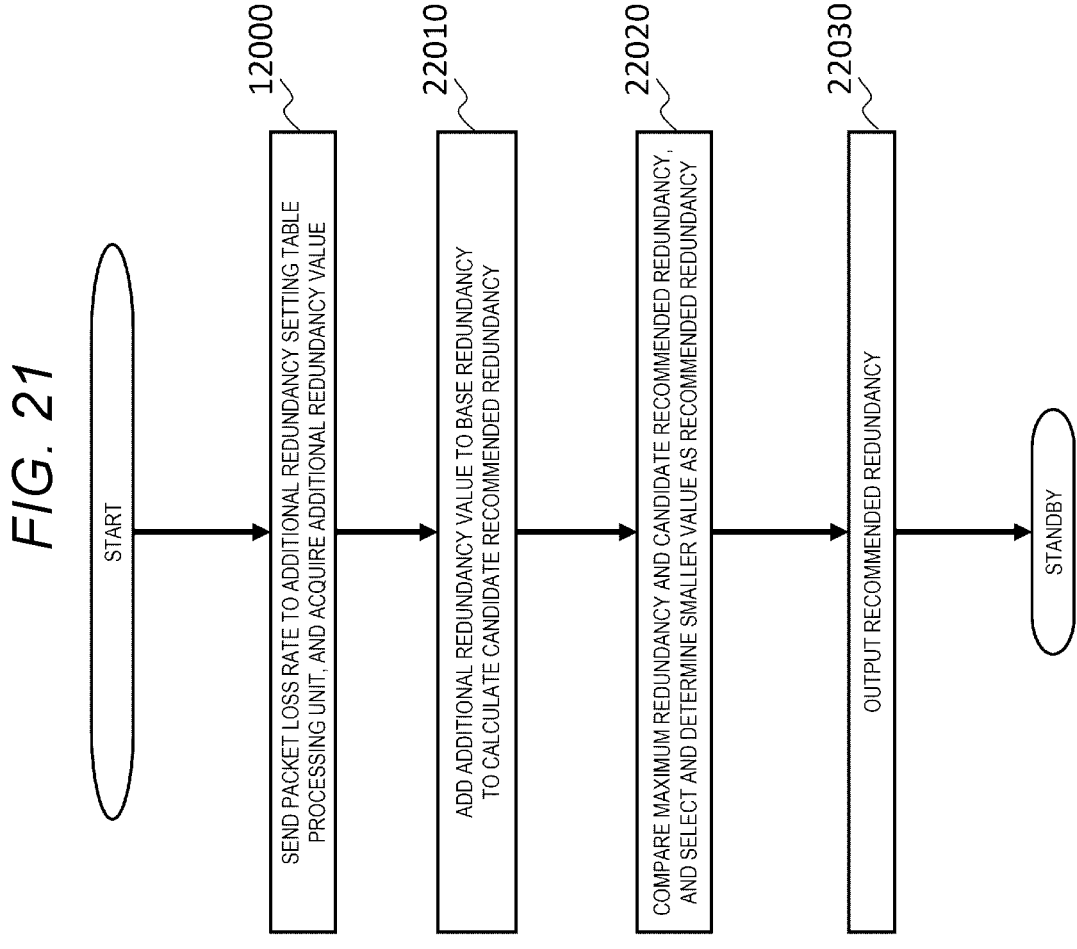

START

12000 — SEND PACKET LOSS RATE TO ADDITIONAL REDUNDANCY SETTING TABLE PROCESSING UNIT, AND ACQUIRE ADDITIONAL REDUNDANCY VALUE

22010 — ADD ADDITIONAL REDUNDANCY VALUE TO BASE REDUNDANCY TO CALCULATE CANDIDATE RECOMMENDED REDUNDANCY

22020 — COMPARE MAXIMUM REDUNDANCY AND CANDIDATE RECOMMENDED REDUNDANCY, AND SELECT AND DETERMINE SMALLER VALUE AS RECOMMENDED REDUNDANCY

22030 — OUTPUT RECOMMENDED REDUNDANCY

STANDBY

FIG. 24

APPLICATION SETTING

SETTING TABLE FOR EACH APPLICATION

| APPLICA-TION ID | PRIORITY COEFFICIENT | MAXIMUM REDUNDANCY | BASE REDUNDANCY | MINIMUM REDUNDANCY | update/remove |
|---|---|---|---|---|---|
| 10 | 1.0 | 5 | 3 | 3 | update remove |
| 20 | 1.5 | 3 | 2 | 2 | update remove |
| 30 | 1.8 | 2 | 1 | 1 | update remove |
| Add New | | | | | |

Save   Close 5100
5110
5120
5130

2001a  2001b  2001c  2001d  2001e  2001f  2001g
~2001

| APPLICATION ID | PRIORITY COEFFICIENT | MAXIMUM REDUNDANCY | BASE REDUNDANCY | MINIMUM REDUNDANCY | CURRENT REDUNDANCY | PREDICTED BANDWIDTH (PREVIOUS) |
|---|---|---|---|---|---|---|
| 10 | 1.0 | 5 | 3 | 3 | 3 | 50 |
| 20 | 1.5 | 3 | 2 | 2 | 2 | 50 |
| 30 | 1.8 | 2 | 1 | 1 | 1 | 100 |

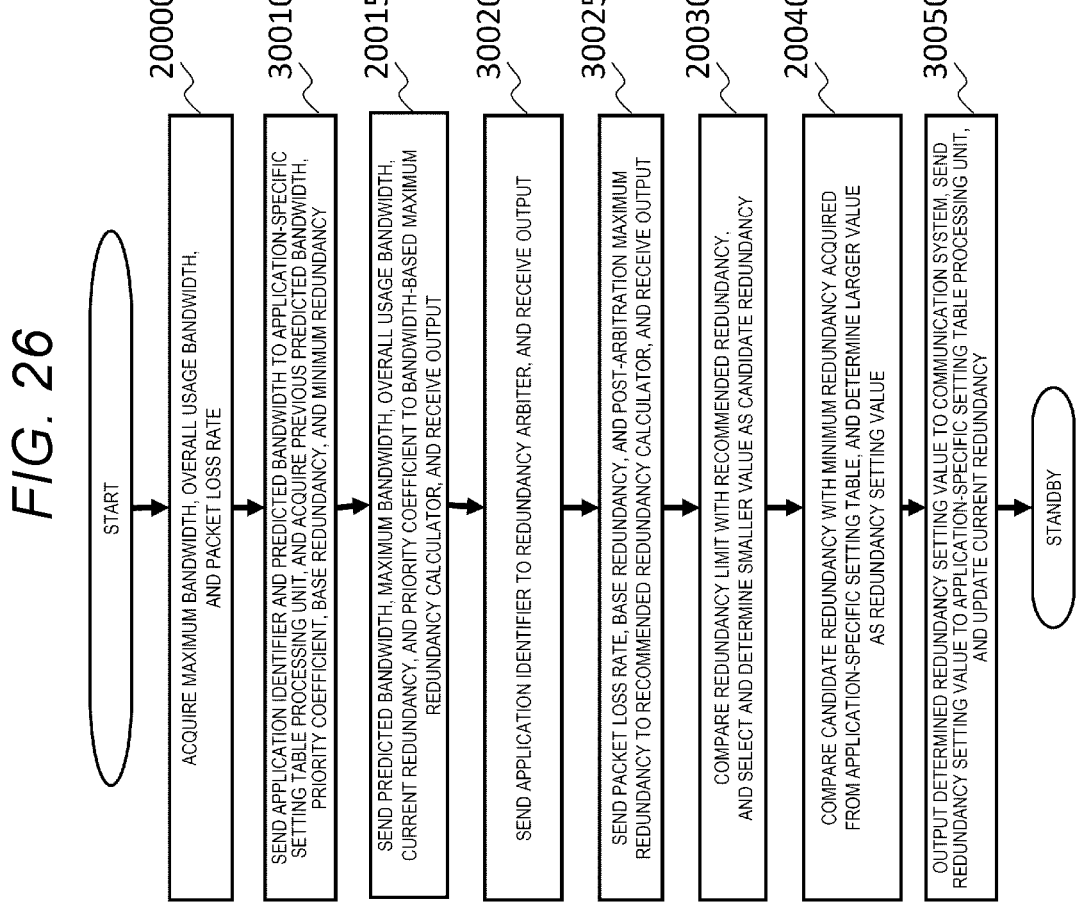

START

20000
ACQUIRE MAXIMUM BANDWIDTH, OVERALL USAGE BANDWIDTH, AND PACKET LOSS RATE

30010
SEND APPLICATION IDENTIFIER AND PREDICTED BANDWIDTH TO APPLICATION-SPECIFIC SETTING TABLE PROCESSING UNIT, AND ACQUIRE PREVIOUS PREDICTED BANDWIDTH, PRIORITY COEFFICIENT, BASE REDUNDANCY, AND MINIMUM REDUNDANCY

20015
SEND PREDICTED BANDWIDTH, MAXIMUM BANDWIDTH, OVERALL USAGE BANDWIDTH, CURRENT REDUNDANCY, AND PRIORITY COEFFICIENT TO BANDWIDTH-BASED MAXIMUM REDUNDANCY CALCULATOR, AND RECEIVE OUTPUT

30020
SEND APPLICATION IDENTIFIER TO REDUNDANCY ARBITER, AND RECEIVE OUTPUT

30025
SEND PACKET LOSS RATE, BASE REDUNDANCY, AND POST-ARBITRATION MAXIMUM REDUNDANCY TO RECOMMENDED REDUNDANCY CALCULATOR, AND RECEIVE OUTPUT

20030
COMPARE REDUNDANCY LIMIT WITH RECOMMENDED REDUNDANCY, AND SELECT AND DETERMINE SMALLER VALUE AS CANDIDATE REDUNDANCY

20040
COMPARE CANDIDATE REDUNDANCY WITH MINIMUM REDUNDANCY ACQUIRED FROM APPLICATION-SPECIFIC SETTING TABLE, AND DETERMINE LARGER VALUE AS REDUNDANCY SETTING VALUE

30050
OUTPUT DETERMINED REDUNDANCY SETTING VALUE TO COMMUNICATION SYSTEM, SEND REDUNDANCY SETTING VALUE TO APPLICATION-SPECIFIC SETTING TABLE PROCESSING UNIT, AND UPDATE CURRENT REDUNDANCY

STANDBY

REDUNDANCY CONTROL DEVICE, REDUNDANCY CONTROL METHOD, AND REDUNDANCY CONTROL PROGRAM

BACKGROUND OF THE INVENTION

1. Field of the Invention

The present invention relates to a redundancy control device and the like for setting a redundancy for a communication system allowing communication via a network according to a set redundancy.

2. Description of Related Art

In a public cloud, since resources of a data center are divided and allocated for various users, the resources are shared and used. A CPU, a memory, and the like mounted on a server can separate an influence among the users by using a virtualization function of hardware or the like.

On the other hand, the network is difficult to realize complete separation because a fixed separation causes a decrease in use efficiency. Therefore, although a plurality of network switches are connected by a redundant path to provide a sufficient bandwidth, packet loss may occur in a case where communication is concentrated on a specific path. In addition, a platform operator operating a data center may perform maintenance of a network without notifying a user, and packet loss may occur when a failed or aged network switch is replaced at any timing.

As a countermeasure against such an abnormal event on such a shared network, it is effective to set a multipath such that communication can be executed through a plurality of paths, and to duplicate and redundantly transmit communication data. In a case where an abnormal event occurs, the communication can be continued without waiting for automatic recovery from the abnormal event by receiving data that has passed through a path that is not affected.

In recent years, as shown in NPL 1, standards have been developed for multipath communication, and a multipath TCP communication function has been introduced as a standard function of an operating system. However, when this function is simply used, a trade-off occurs between availability and a usable maximum bandwidth.

As a technique for redundancy in communication, for example, PTL 1 discloses redundancy in a time direction in which the number of times of transmission is increased in accordance with a communication state.

In addition, PTL 2 discloses that a redundancy is determined based on a communication speed such that a time until transmission is completed is within a certain delay time in accordance with a communication state, and redundant data is added and transmitted using a method such as a forward correction code according to the redundancy.

Further, PTL 3 discloses a method of maintaining an order of data in a case where time series data is redundantly transmitted while changing a communication path among a plurality of paths.

CITATION LIST

Patent Literature

PTL 1: JP2023-039257A
PTL 2: JP2023-006210A
PTL 3: JP2015-122697A

Non Patent Literature

NPL 1: RFC8684 "TCP Extensions for Multipath Operation with Multiple Addresses"

SUMMARY OF THE INVENTION

A method of avoiding an abnormal event of a shared network by establishing a multipath and redundantly transferring duplicated data is a trade-off with a usable maximum bandwidth. It is assumed that an occurrence probability of the abnormal event is P ($0<P<1$) and each abnormal event independently occurs. When a redundancy of communication is N, that is, when data is duplicated to N times thereof and is redundantly transmitted to different paths, it is expected that a probability that an abnormal event affects the communication is reduced to PN. However, since a bandwidth to be used also increases to N times thereof, a usable maximum bandwidth decreases to 1/N. Thus, when the redundancy is fixedly determined, the maximum bandwidth is also fixedly limited. Therefore, it is important how the redundancy of the communication is set.

The present invention has been made in view of the above circumstances, and an object thereof is to provide a technique capable of appropriately setting a redundancy of communication in a communication system.

In order to achieve the above-mentioned object, a redundancy control device according to one aspect is a redundancy control device for setting a redundancy for a communication system allowing communication via a network according to a set redundancy, and the redundancy control device includes a processor. In the redundancy control device, the processor receives, from an application, a use-predicted communication bandwidth which is a communication bandwidth predicted to be used in the network, determines a redundancy limit which is an upper limit of a redundancy in communication by the based on application a communication bandwidth usable in the network and the use-predicted communication bandwidth, and sets, in the communication system, a redundancy equal to or less than the determined redundancy limit as the redundancy of the communication by the application.

According to the present invention, it is possible to appropriately set the redundancy of the communication in the communication system.

BRIEF DESCRIPTION OF THE DRAWINGS

FIG. 2 is a diagram illustrating packet loss detection and data retransmission;

FIG. 7 is a flowchart of a redundancy control process according to the first embodiment;

FIG. 9 is a flowchart of a redundancy limit calculation process according to the first embodiment;

FIG. 10 is a functional configuration diagram of a recommended redundancy calculator according to the first embodiment;

FIG. 11 is a flowchart of a recommended redundancy calculation process according to the first embodiment;

FIG. 14 is a diagram illustrating a setting screen according to the first embodiment;

FIG. 15 is a configuration diagram of a computer system according to a second embodiment;

FIG. 16 is a functional configuration diagram of a redundancy controller according to the second embodiment;

FIG. 17 is a flowchart of a redundancy control process according to the second embodiment;

FIG. 18 is a functional configuration diagram of a bandwidth-based redundancy limit calculator according to the second embodiment;

FIG. 19 is a flowchart of a redundancy limit calculation process according to the second embodiment;

FIG. 21 is a flowchart of a recommended redundancy calculation process according to the second embodiment;

FIG. 24 is a diagram illustrating a setting screen according to the second embodiment;

FIG. 25 is a functional configuration diagram of a redundancy controller according to a third embodiment;

FIG. 26 is a flowchart of a redundancy control process according to the third embodiment;

DESCRIPTION OF EMBODIMENTS

Embodiments will be described with reference to the drawings. The embodiments to be described later do not limit the invention according to the claims, and all of various elements described in the embodiments and combinations thereof are not necessarily essential to the solution of the present invention.

In the following description, information may be described by an expression of "AAA table", and the information may be expressed in any data structure. That is, in order to indicate that the information does not depend on the data structure, the "AAA table" can be referred to as "AAA information".

Figure 1:
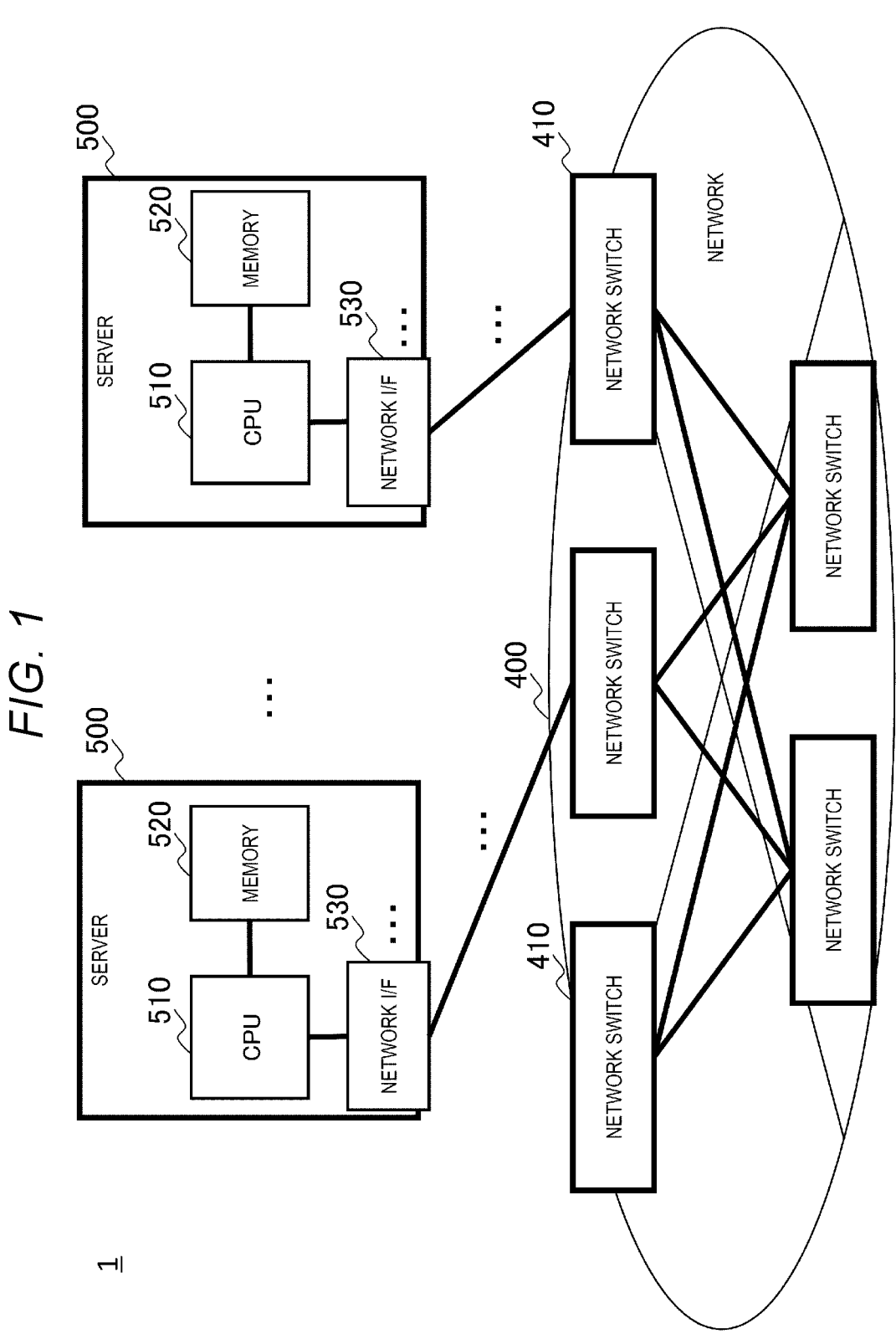
FIG. 1 is a hardware configuration diagram of a computer system according to an embodiment.

FIG. 1 is a hardware configuration diagram of a computer system according to an embodiment.

A computer system 1 includes a plurality of servers 500 and a network 400 that connects the plurality of servers 500.

The server 500 includes a central processing unit (CPU) 510 that is implemented by a general-purpose server and a computer such as a personal computer (PC) and is as an example of a processor, a memory 520 as an example of a storage unit, and one or more network interfaces (network I/Fs) 530.

The network I/F 530 is an interface such as a wired LAN card or a wireless LAN card, and communicates with another device (for example, the server 500) via the network 400. In a case where there are a plurality of network I/Fs 530, those may be connected to a same network switch 410 of the network 400 or may be connected to different network switches 410.

The CPU 510 executes various processes in accordance with programs stored in the memory 520.

The memory 520 is, for example, a random access memory (RAM), and stores (redundancy control program) to be executed by the CPU 510 and necessary information.

The network 400 includes a plurality of network switches 410. In the network 400, redundant connection paths are provided among the network switches 410 such that a plurality of redundant communication paths can be set for a pair of servers 500 that execute communication, and a function is provided in which even when the network switch 410 is replaced for failure, planned maintenance, or the like of the network switch 410, the communication between the servers 500 is automatically recovered by automatically setting an alternative connection path. Therefore, even when a packet cannot pass through some of the network switches 410 due to a failure or a replacement, it is possible to prevent a state in which the communication between the servers 500 is disabled from continuing.

In the computer system 1, since a communication packet is lost (packet loss occurs) in a case where some problem actually occurs in the network 400, the server 500 (for example, software operating inside the server 500) executes a retransmission process of the packet in order to recover the communication.

In the server 500, a retransmission process in TCP/IP communication, which is commonly used, is executed mainly by two kinds of triggers as described below.

Figure 2:
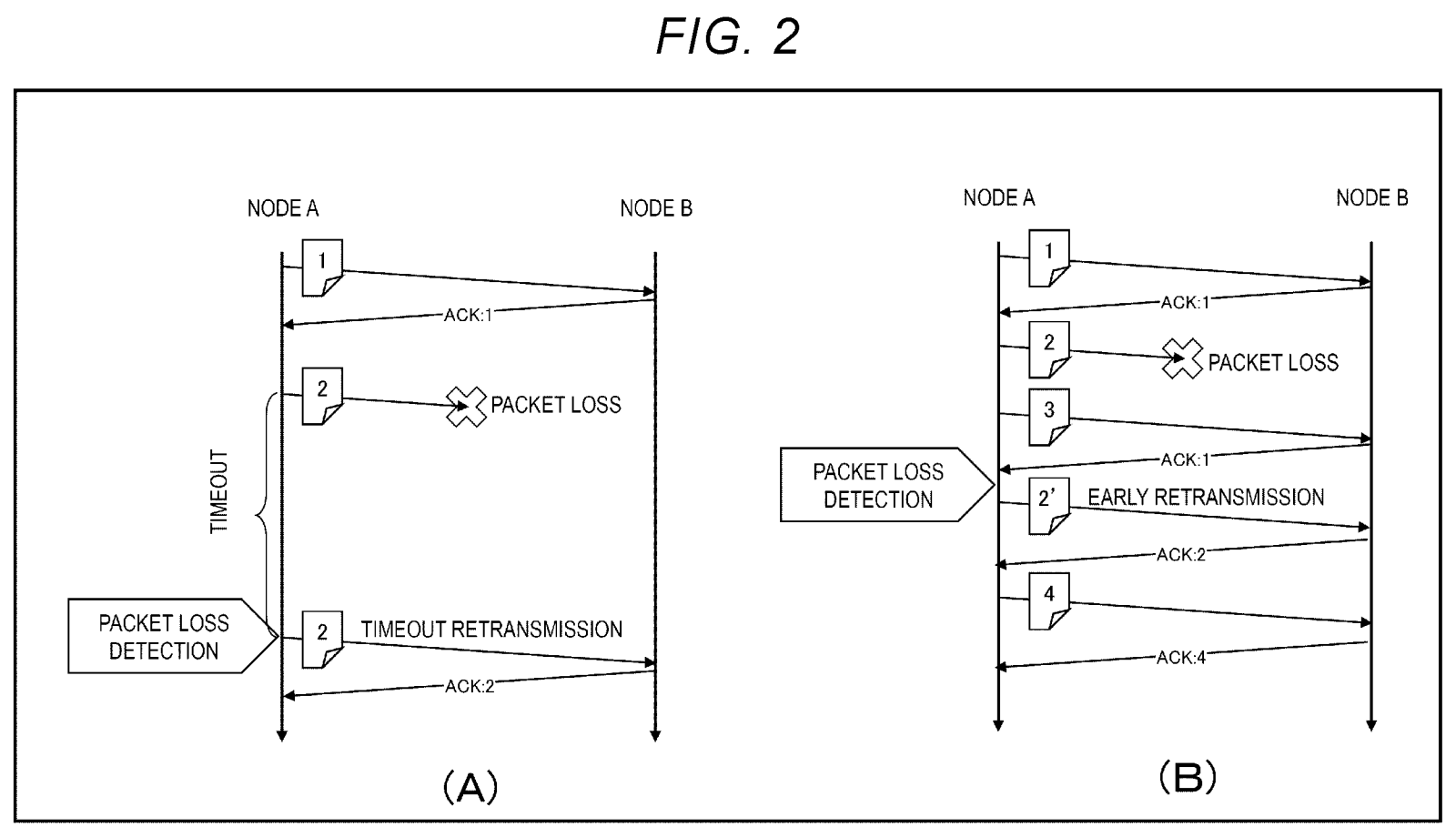

FIG. 2 is a diagram illustrating packet loss detection and data retransmission. FIG. 2A illustrates packet loss detection and a data retransmission process in a case where a communication frequency is low, and FIG. 2B illustrates packet loss detection and a data retransmission process in a case where the communication frequency is high.

In a case where a communication frequency between a node A and a node B is low, as illustrated in FIG. 2A, a transmission-side node transmits a packet, and when the transmission-side node cannot receive a reception response (ACK) signal from a reception-side node for a certain period of time and a retransmission timeout time set at the time of transmission has passed, a retransmission operation of the packet is executed. The retransmission timeout time is set to be longer than a general communication delay time, and is set to, for example, 200 milliseconds as a minimum time. In a case where the reception response signal cannot be obtained by one retransmission, the transmission-side node repeats operations of standby and retransmission while increasing the timeout time until the communication succeeds. In this case, it takes a relatively long time to transmit the packet normally.

On the other hand, in a case where the communication frequency is high, as illustrated in FIG. 2B, when a subsequent packet arrives at the reception-side node earlier when some packets are lost, the reception-side node returns a special reception response in response to the arrival of the packet, and the transmission-side node can detect the packet loss at an early stage. In this case, since the transmission-side node executes a retransmission operation at an early stage, a time until recovery becomes relatively short.

Next, a preferred communication method for each communication frequency will be described.

Figure 3:
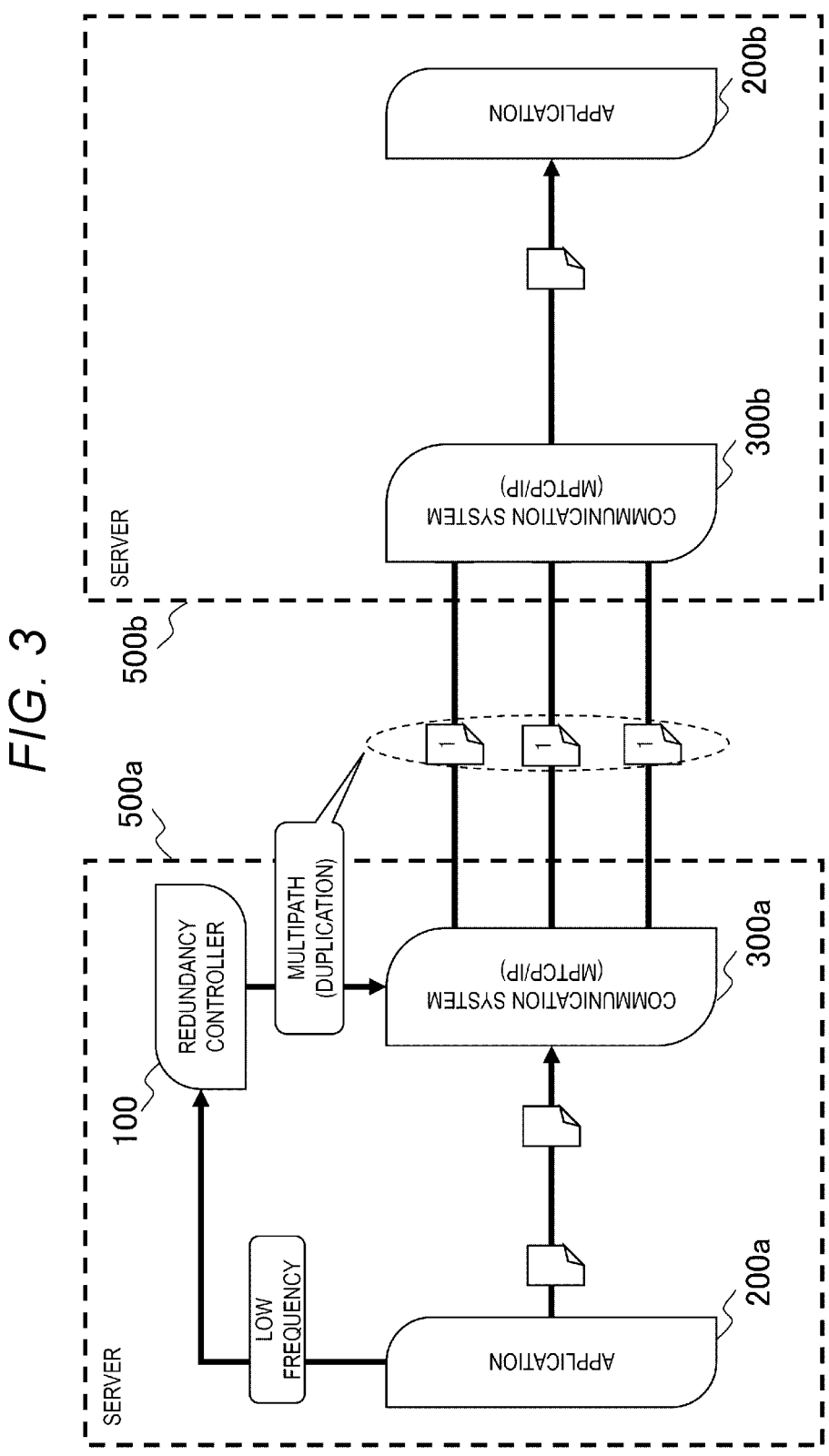
FIG. 3 is a diagram illustrating a preferred communication method in a case where a communication frequency is low.
Figure 4:
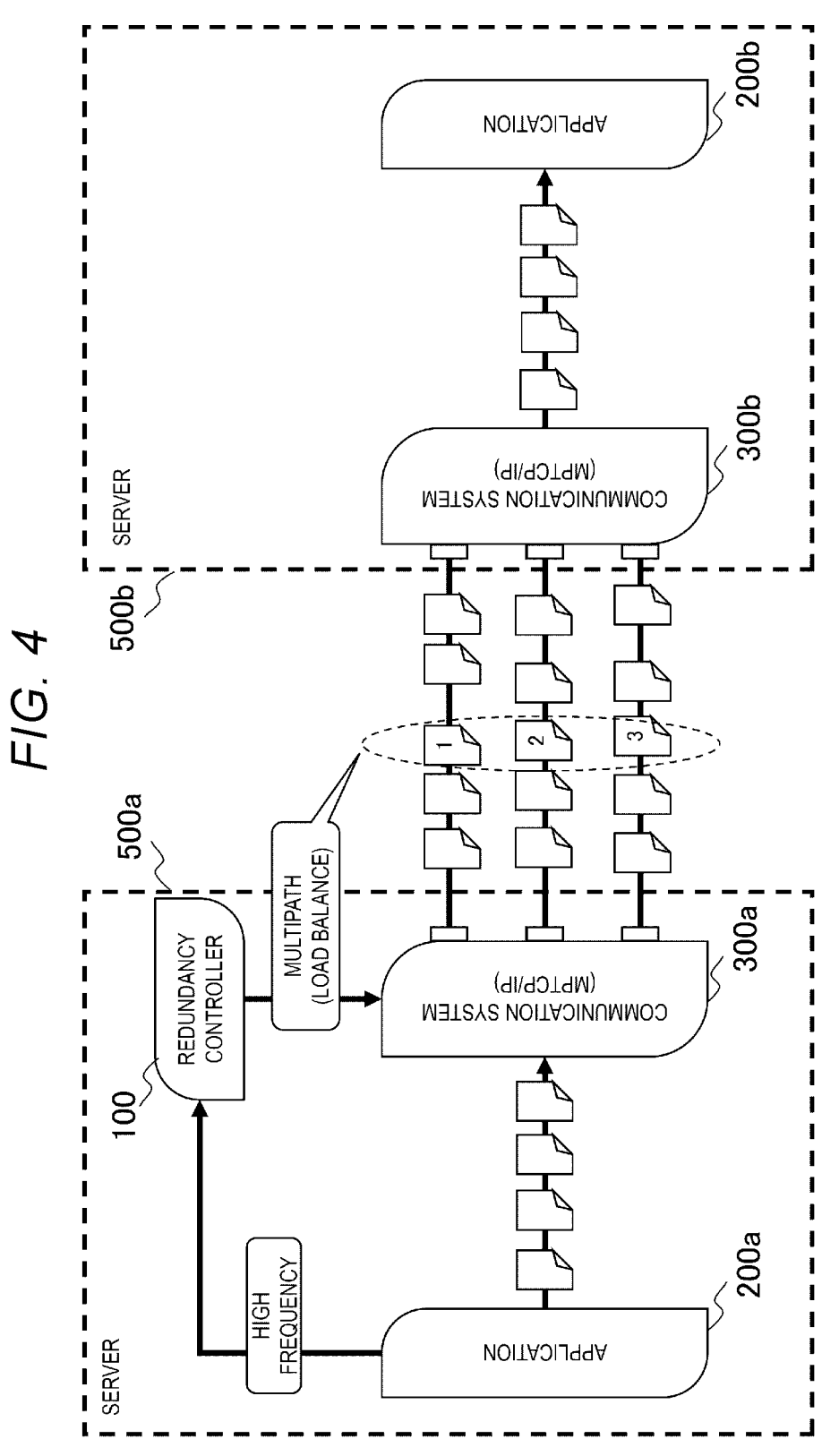
FIG. 4 is a diagram illustrating a preferred communication method in a case where the communication frequency is high.

FIG. 3 is a diagram illustrating a preferred communication method in the case where the communication frequency is low, and FIG. 4 is a diagram illustrating a preferred communication method in the case where the communication frequency is high.

In the case where the communication frequency is low, as illustrated in FIG. 3, since duplicated data passes through a plurality of communication paths, even when packet loss occurs in any of the communication paths, communication can be continued by using a packet that has arrived in another path, and it is desirable to shorten the time until recovery. However, in this communication method, since a communication amount is N times a data amount to be transmitted, a usable communication bandwidth is reduced to 1/N of a maximum bandwidth.

On the other hand, in the case where the communication frequency is high, as illustrated in FIG. 4, it is desirable to use a bandwidth to a maximum extent by passing data through the plurality of communication paths without duplicating the data in expectation of application of an early retransmission operation.

As described above, in the application, there is a trade-off in realizing availability and maximizing a usable bandwidth, and an optimum redundancy dynamically changes in accordance with the communication frequency.

In addition, in a case where a plurality of applications are operating in one server, it is not always necessary to provide high availability with a same redundancy for all applications. For example, as an application that causes a storage system to operate, there is an application that executes communication that requires particularly high availability, such as life-and-death monitoring communication executed to maintain operation soundness of the system. In such an application, since a data transfer amount is small and there is a possibility that communication failure cannot maintain the soundness of the system, it is desirable to keep the redundancy high by emphasizing the high availability over the usable maximum bandwidth. On the other hand, for example, in an application that handles user data, since it is possible to execute a retry in a form of requesting a re-execution for a user and it is necessary to increase a maximum performance, there is also an application in which the usable maximum bandwidth should be emphasized over the availability of communication, and in such an application, the redundancy may be set to be low.

As described above, in a case where there are a plurality of applications such as a case where a plurality of applications execute communication in cooperation with each other in order to realize one service, it is possible to achieve a balance between the usable bandwidth and the high availability by adjusting whether it is necessary to increase the redundancy for each application and operating each application.

In addition, in an environment in which a metered rate system is adopted for the communication amount, it may not be appropriate to excessively increase a communication cost for high-availability communication.

In the case where there are a plurality of applications, it may be preferable to appropriately arbitrate an allocation of the redundancy so as to reduce the communication cost.

In the following description of the embodiment, for example, it is assumed that an application 200 (200a and 200b) is loaded in the memory 520 installed in the server 500 and executed by the CPU 510. For example, in a case where the server 500 is virtualized, the application 200 may be executed on a virtual machine called an instance.

First Embodiment

Next, a computer system according to a first embodiment will be described. The first embodiment is an example in which there is one application for which the redundancy is dynamically adjusted.

Figure 5:
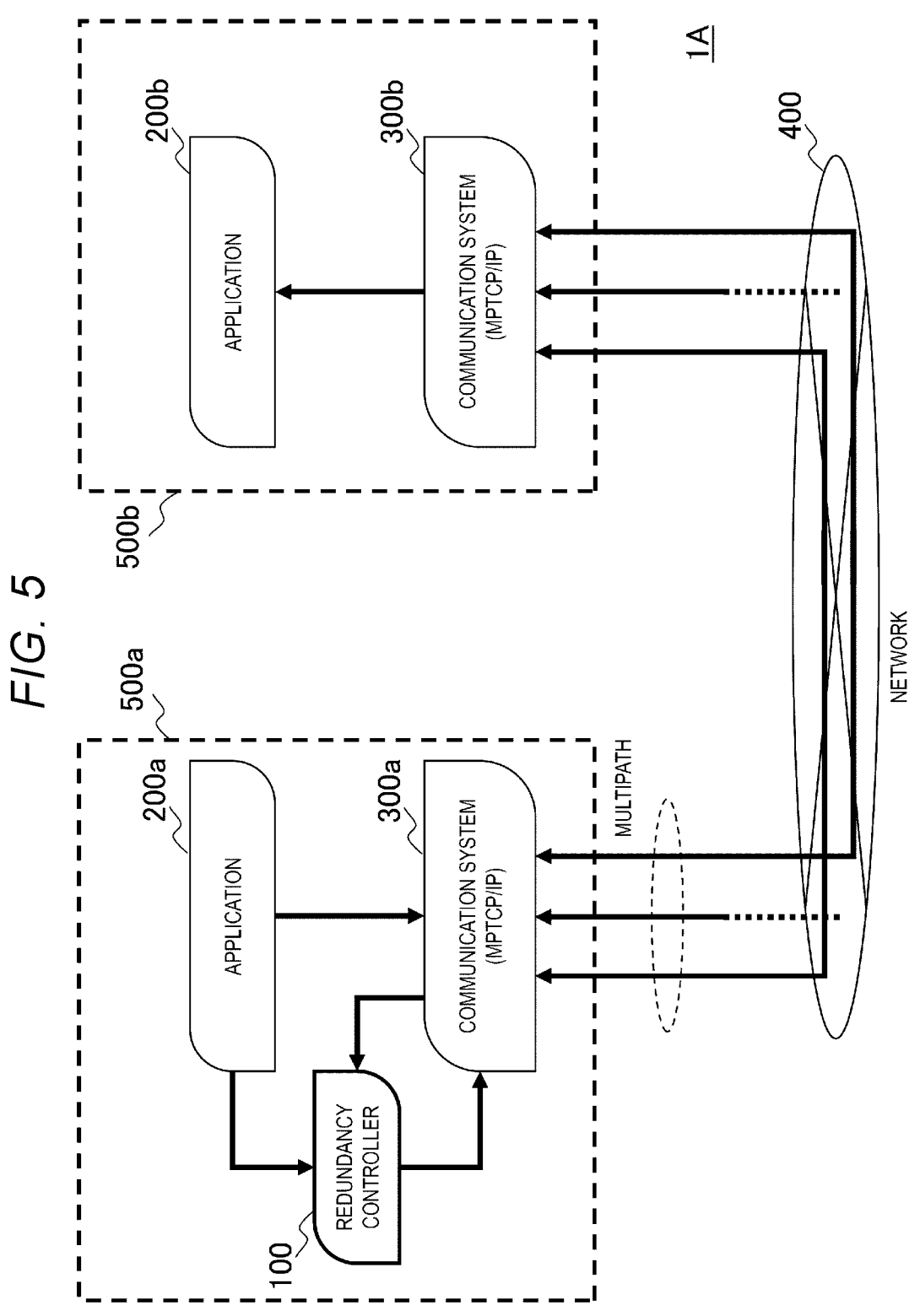
FIG. 5 is a configuration diagram of a computer system according to a first embodiment.

FIG. 5 is a configuration diagram of the computer system according to the first embodiment.

A computer system 1A includes a plurality of servers 500 (500a and 500b), and the server 500a and the server 500b are connected via the network 400.

The server 500a is an example of a redundancy control device, and includes a redundancy controller 100, the application 200a, and a communication system 300a. The server 500a may execute one or more applications (non-target applications) for which the redundancy is not dynamically adjusted, and the communication system 300a may execute communication processing of the non-target applications. The redundancy controller 100, the application 200a, and the communication system 300a are mainly implemented by the CPU 510 executing a program. The server 500b includes the application 200b and a communication system 300b.

For example, the application 200a receives an input and output request (I/O request) for data with respect to the server 500b from a terminal (not illustrated), and executes data exchange (input and output) of target data with the application 200b of the server 500b. FIG. 5 illustrates an example in which the application 200a transmits data to the application 200b.

In addition, when the data is to be transmitted, the application 200a calculates a communication bandwidth (predicted bandwidth: use-predicted communication bandwidth) predicted to be used for communication based on a data size or the like of the target data of the I/O request for the data, and transfers the communication bandwidth to the redundancy controller 100.

The controller 100 determines a redundancy appropriate for the transmission of the data of the application 200a by the communication system 300a based on the predicted bandwidth, and sets the redundancy in the communication system 300a.

The communication system 300a executes communication of the data transmitted and received by the application 200a with another communication system 300 (for example, communication system 300b) in accordance with, for example, MultiPath TCP (MPTCP)/IP using the multipath on the network 400. In this case, the communication system 300a executes communication in which data to be transmitted is made redundant in accordance with a set redundancy, that is, communication in which the data to be transmitted is copied in accordance with the redundancy and the copied data is transmitted through different paths.

The communication system 300b executes communication of the data transmitted and received by the application 200a with another communication system 300 (for example, the communication system 300*a*) in accordance with, for example, MultiPath TCP (MPTCP)/IP using the multipath on the network 400. For example, in a case where data to be received is made redundant, the communication system 300*b* extracts necessary data from the redundant data and transfers the extracted data to the application 200*b*.

The application 200*b* receives the data from the application 200*a* via the communication system 300*b*, and executes a predetermined process such as a process of storing data in a predetermined storage.

In the computer system 1A, when the data is transmitted: 200*a* executed in the server 500*a* to the application 200*b* executed in the server 500*b*, the application 200*a* transmits the predicted bandwidth to the redundancy controller 100 and transfers the data to be transmitted to the communication system 300*a*. The redundancy controller 100 determines a redundancy to be used when the data of the application 200*a* is transmitted based on the predicted bandwidth, and sets the redundancy in the communication system 300*a*. The communication system 300*a* makes the data redundant in accordance with the redundancy set by the redundancy controller 100, and transmits the redundant data to the communication system 300*b* of the server 500*b* using the multipath of the network 400.

The communication system 300*b* of the server 500*b* receives the transmitted redundant data via the network, extracts necessary data from the redundant data, and transfers the extracted data to the application 200*b*. The application 200*b* executes a predetermined process using the data received from the communication system 300*b*.

According to the computer system 1A, the data to be transmitted by the application 200*a* can be dynamically transmitted with an appropriate redundancy between the server 500*a* and the server 500*b*.

Next, the redundancy controller 100 will be described in detail.

Figure 6:
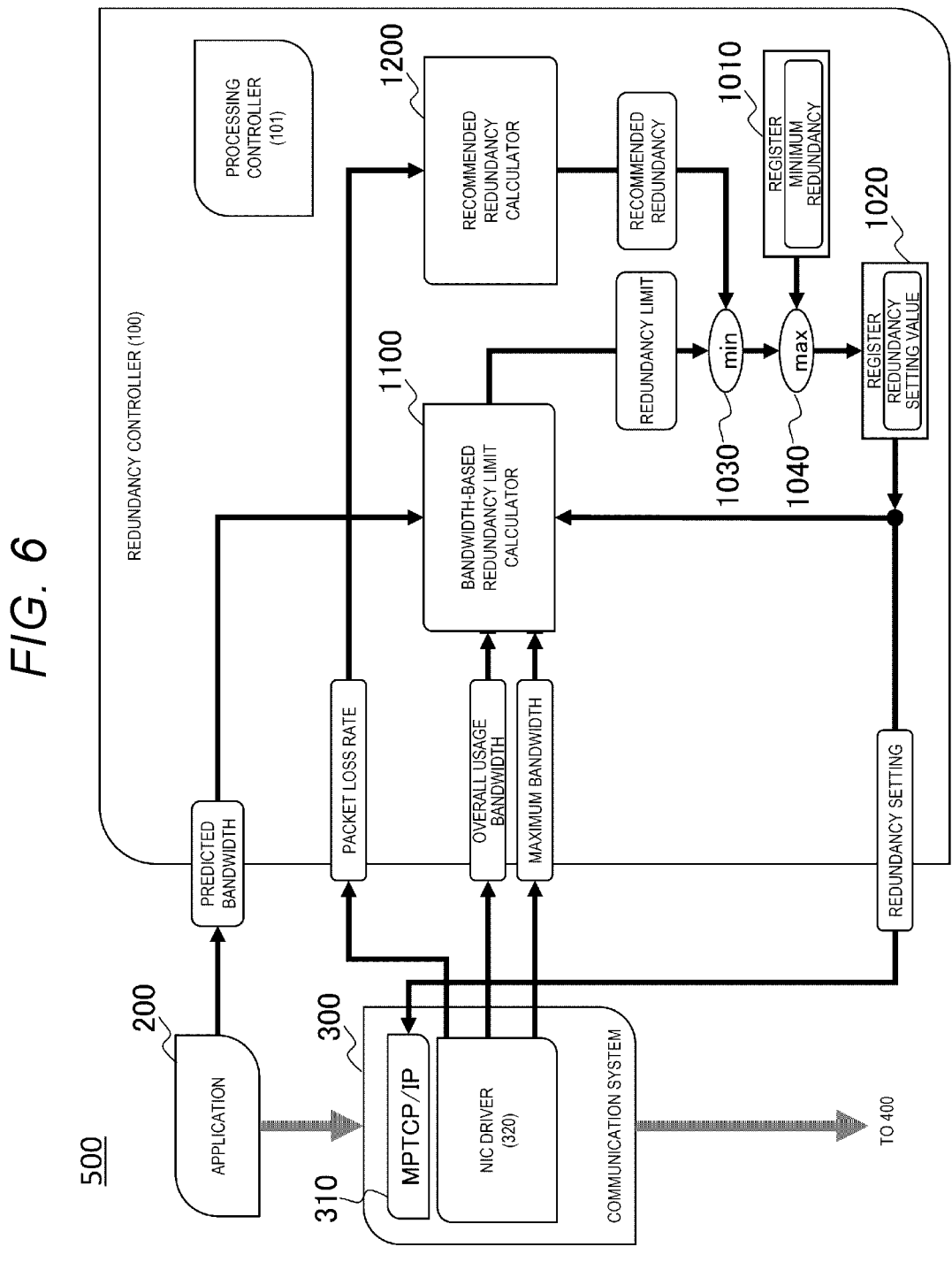
FIG. 6 is a functional configuration diagram of a redundancy controller according to the first embodiment.

FIG. 6 is a functional configuration diagram of the redundancy controller according to the first embodiment.

The redundancy controller 100 includes a processing controller 101, a bandwidth-based redundancy limit calculator 1100, a recommended redundancy calculator 1200, a register 1010, a register 1020, a minimum operator 1030, and a maximum operator 1040.

The processing controller 101 integrally controls exchange of various kinds of information with the application 200 and the communication system 300, and exchange of processing and information by each unit provided in the redundancy controller 100. Here, the communication system 300 includes an MPTCP/IP driver 310 and a network: interface card (NIC) driver 320. The MPTCP/IP driver 310 executes communication in accordance with a MPTCP/IP. Specifically, the MPTCP/IP driver 310 duplicates communication target data N times in accordance with a set redundancy N, and transmits respective pieces of the duplicated communication target data to a transmission side through different paths. The NIC driver 320 executes communication corresponding to a NIC.

The bandwidth-based redundancy limit calculator 1100 calculates an upper limit of the redundancy (redundancy limit) for the application in a case where a bandwidth usable by the communication system 300 is taken into consideration, and outputs the upper limit. Details of the bandwidth-based redundancy limit calculator 1100 will be described later.

The recommended redundancy calculator 1200 calculates a recommended value of the redundancy (recommended redundancy) at the time of transmitting the data of the application 200, and outputs the recommended value. Details of the recommended redundancy calculator 1200 will be described later.

The register 1010 stores a minimum value of the redundancy (minimum redundancy) in the communication of the application 200. The register 1020 stores a setting value of a redundancy value (redundancy setting value: current redundancy) in the communication of the application 200.

The minimum operator 1030 outputs a smaller value of the redundancy limit output from the bandwidth-based redundancy limit calculator 1100 and the recommended redundancy output from the recommended redundancy calculator 1200. Accordingly, a value output from the minimum operator 1030 is always equal to or less than the redundancy limit.

The maximum operator 1040 outputs a larger value of an output value from the minimum operator 1030 and the minimum redundancy of the register 1010. The value output is stored as the redundancy setting value in the register 1020 by the processing controller 101, and the redundancy setting value is set in the MPTCP/IP driver 310 of the communication system 300 by the processing controller 101.

Next, a redundancy control process by the redundancy controller 100 will be described.

FIG. 7 is a flowchart of the redundancy control process according to the first embodiment.

The redundancy control process is executed, for example, in a case where the redundancy controller 100 receives the predicted bandwidth from the application 200. The redundancy control process is not limited thereto, and may be executed in a case where there is a change in a packet loss rate or in a case where an overall usage bandwidth changes by a certain amount or more.

First, the processing controller 101 acquires, from the NIC driver 320, a largest bandwidth (maximum bandwidth) usable in the network 400 by the communication system 300, the entire bandwidth (overall usage bandwidth) actually used by the communication system 300, and the packet loss rate (an example of a communication quality indicator) in the communication in the network 400 (10000).

Next, the processing controller 101 transfers the predicted bandwidth, the maximum bandwidth, and the overall usage bandwidth to the bandwidth-based redundancy limit calculator 1100, acquires the redundancy setting value (current redundancy) from the register 1020, transfers the redundancy setting value to the bandwidth-based redundancy limit calculator 1100, and receives an output (redundancy limit) from the bandwidth-based redundancy limit calculator 1100 (10010).

Next, the processing controller 101 transfers the packet loss rate to the recommended redundancy calculator 1200, and receives an output (recommended redundancy) from the recommended redundancy calculator 1200 (10020).

Next, the processing controller 101 inputs the redundancy limit and the recommended redundancy to the minimum operator 1030. The minimum operator 1030 determines a smaller value of the redundancy limit and the recommended redundancy as a candidate redundancy and outputs the determined value to the processing controller 101 (10030).

Next, the processing controller 101 inputs the candidate redundancy to the maximum operator 1040, acquires the minimum redundancy from the register 1010, and inputs the minimum redundancy to the maximum operator 1040. The maximum operator 1040 determines a larger value of the candidate redundancy and the minimum redundancy as the redundancy setting value and outputs the determined value to the processing controller 101 (10040).

The processing controller 101 sets the redundancy setting value in the register 1020, sets the redundancy setting value as a redundancy to be used in the MPTCP/IP driver 310 of the communication system 300 (10050), and brings the redundancy controller 100 into a standby state. Accordingly, in the communication system 300, communication is executed after redundancy is executed in accordance with the redundancy setting value.

Next, the bandwidth-based redundancy limit calculator 1100 will be described in detail.

Figure 8:
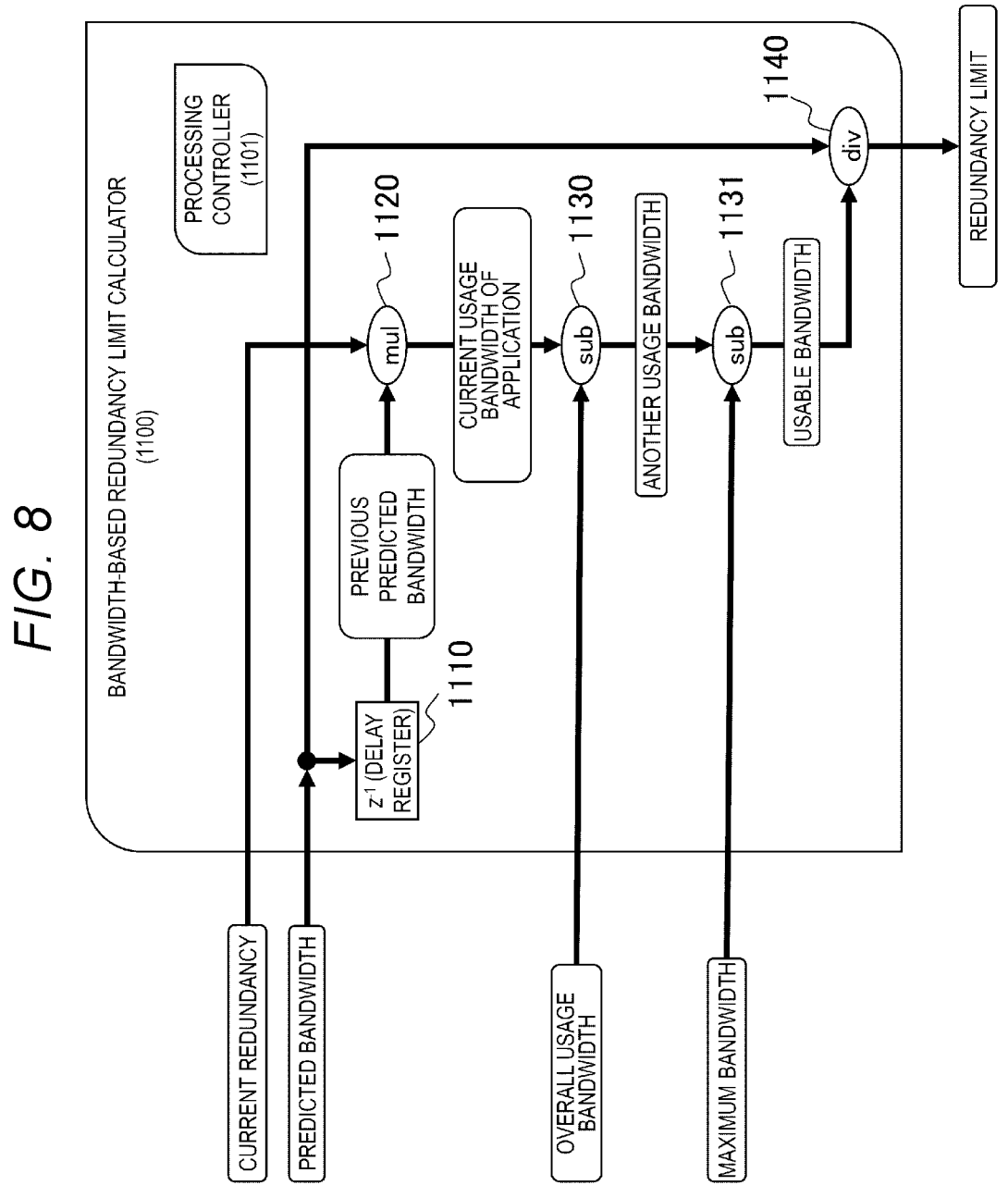
FIG. 8 is a functional configuration diagram of a bandwidth-based redundancy limit calculator according to the first embodiment.

FIG. 8 is a functional configuration diagram of the bandwidth-based redundancy limit calculator according to the first embodiment.

The bandwidth-based redundancy limit calculator 1100 includes a processing controller 1101, a delay register 1110, a multiplier 1120, a subtracter 1130, a subtracter 1131, and an integer divider 1140.

The processing controller 1101 receives various kinds of information (maximum bandwidth, overall usage bandwidth, predicted bandwidth, and current redundancy) input from the processing controller 101, and integrally controls exchange of processing and information by each unit provided in the bandwidth-based redundancy limit calculator 1100.

The delay register 1110 holds and outputs a last predicted bandwidth (previous predicted bandwidth).

The multiplier 1120 multiplies the input current redundancy by the previous predicted bandwidth to calculate a usage bandwidth at the current (current usage bandwidth) of the application 200 (target application), and outputs the usage bandwidth.

The subtracter 1130 subtracts the current usage bandwidth from the input overall usage bandwidth to calculate a usage bandwidth (another usage bandwidth) used by an application other than the target application, and outputs the usage bandwidth.

The subtracter 1131 subtracts the another usage bandwidth from the input maximum bandwidth to calculate a bandwidth usable at the current (usable bandwidth), and outputs the bandwidth.

The integer divider 1140 divides the usable bandwidth by the predicted bandwidth, obtains an integer value by rounding down a fraction below a decimal point of a quotient thereof, and outputs the integer value as the redundancy limit.

Next, a redundancy limit calculation process executed by the bandwidth-based redundancy limit calculator 1100 will be described.

FIG. 9 is a flowchart of the redundancy limit calculation process according to the first embodiment.

The redundancy limit calculation process is executed, for example, in a case where the bandwidth-based redundancy limit calculator 1100 acquires a calculation instruction (maximum bandwidth, overall usage bandwidth, predicted bandwidth, current redundancy) from the processing controller 101.

First, the processing controller 1101 acquires the previous predicted bandwidth from the delay register 1110, and sets the input predicted bandwidth in the delay register 1110 (11000).

Next, the processing controller 1101 inputs the previous predicted bandwidth and the input current redundancy to the multiplier 1120. The multiplier 1120 multiplies the current redundancy by the previous predicted bandwidth to calculate a current usage bandwidth, and outputs the current usage bandwidth to the processing controller 1101 (11010).

Next, the processing controller 1101 inputs the current usage bandwidth and the input overall usage bandwidth to the subtracter 1130. The subtracter 1130 subtracts the current usage bandwidth from the overall usage bandwidth to calculate another usage bandwidth, and outputs the another usage bandwidth to the processing controller 1101 (11020).

Next, the processing controller 1101 inputs the input maximum bandwidth and the another usage bandwidth to the subtracter 1131. The subtracter 1131 subtracts the another usable bandwidth from the maximum bandwidth to calculate a usable bandwidth, and outputs the usable bandwidth to the processing controller 1101 (11030).

Next, the processing controller 1101 inputs the usable bandwidth and the input predicted bandwidth to the integer divider 1140. The integer divider 1140 divides the usable bandwidth by the predicted bandwidth, obtains an integer value by rounding down a fraction below a decimal point of a quotient thereof, and outputs the integer value as the redundancy limit to the processing controller 1101 (11040).

Next, the processing controller 1101 outputs the redundancy limit to the processing controller 101 (11050), and brings the bandwidth-based redundancy limit calculator 1100 into a standby state. According to the redundancy limit calculation process, in a communication state at that time, it is possible to appropriately calculate the redundancy limit which is the upper limit of the redundancy possible at the time of transmitting data of the predicted bandwidth.

Next, the recommended redundancy calculator 1200 will be described in detail.

Figure 10:
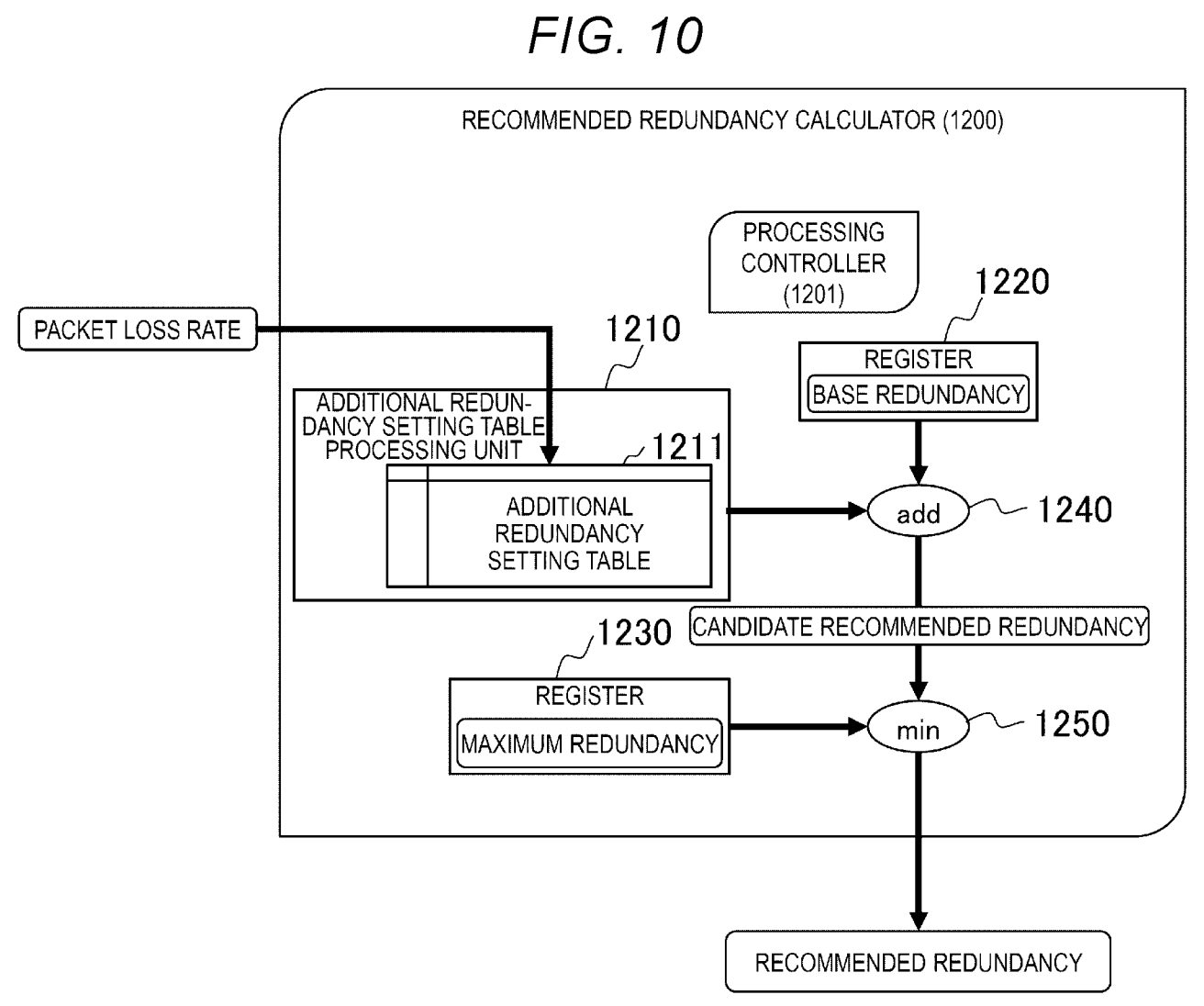

FIG. 10 is a functional configuration diagram of the recommended redundancy calculator according to the first embodiment.

The recommended redundancy calculator 1200 includes a processing controller 1201, an additional redundancy setting table processing unit 1210, a register 1220, a register 1230, an adder 1240, and a minimum operator 1250.

The processing controller 1201 receives the packet loss rate input from the processing controller 101, and integrally controls exchange of processing and information by each unit provided in the recommended redundancy calculator 1200.

The additional redundancy setting table processing unit 1210 executes a process of receiving a packet loss rate and outputting a corresponding additional redundancy, including an additional redundancy setting table 1211 indicating a correspondence relation between the packet loss rate and a redundancy to be added (additional redundancy: an example of redundancy specifying information). Details of the additional redundancy setting table processing unit 1210 will be described later.

The register 1220 stores a base value of the redundancy (base redundancy) in the communication of the application 200. The register 1230 stores a maximum value of the redundancy value (maximum redundancy) in the communication of the application 200.

The adder 1240 adds the base redundancy and the additional redundancy to calculate a candidate recommended redundancy, and outputs the candidate recommended redundancy.

The minimum operator 1250 outputs a smaller value of maximum the redundancy and the candidate recommended redundancy as the recommended redundancy.

Next, a recommended redundancy calculation process by the recommended redundancy calculator 1200 will be described.

FIG. 11 is a flowchart of the recommended redundancy calculation process according to the first embodiment.

The recommended redundancy calculation process is executed, for example, in a case where the recommended redundancy calculator 1200 acquires a calculation instruction (packet loss rate) from the processing controller 101.

First, the processing controller 1201 sends the acquired packet loss rate to the additional redundancy setting table processing unit 1210, and acquires an additional redundancy value from the additional redundancy setting table processing unit 1210 (12000).

Next, the processing controller 1201 inputs the additional redundancy value to the adder 1240, acquires the base redundancy from the register 1220, and inputs the base redundancy to the adder 1240. The adder 1240 adds the base redundancy and the additional redundancy value to calculate a candidate recommended redundancy, and outputs the candidate recommended redundancy to the processing controller 1201 (12010).

Next, the processing controller 1201 inputs the candidate recommended redundancy to the minimum operator 1250, acquires a maximum redundancy from the register 1230, and inputs the maximum redundancy to the minimum operator 1250. The minimum operator 1250 outputs a smaller value of the maximum redundancy and the candidate recommended redundancy to the processing controller 1201 as the recommended redundancy (12020).

Next, the processing controller 1201 outputs the recommended redundancy to the processing controller 101 (12030), and brings the recommended redundancy calculator 1200 into a standby state. According to the recommended redundancy calculation process, it is possible to appropriately calculate a recommended redundancy which is an appropriate redundancy in consideration of the packet loss rate, and it is possible to reduce a network load and power consumption.

Next, the additional redundancy setting table processing unit 1210 will be described in detail.

Figure 12:
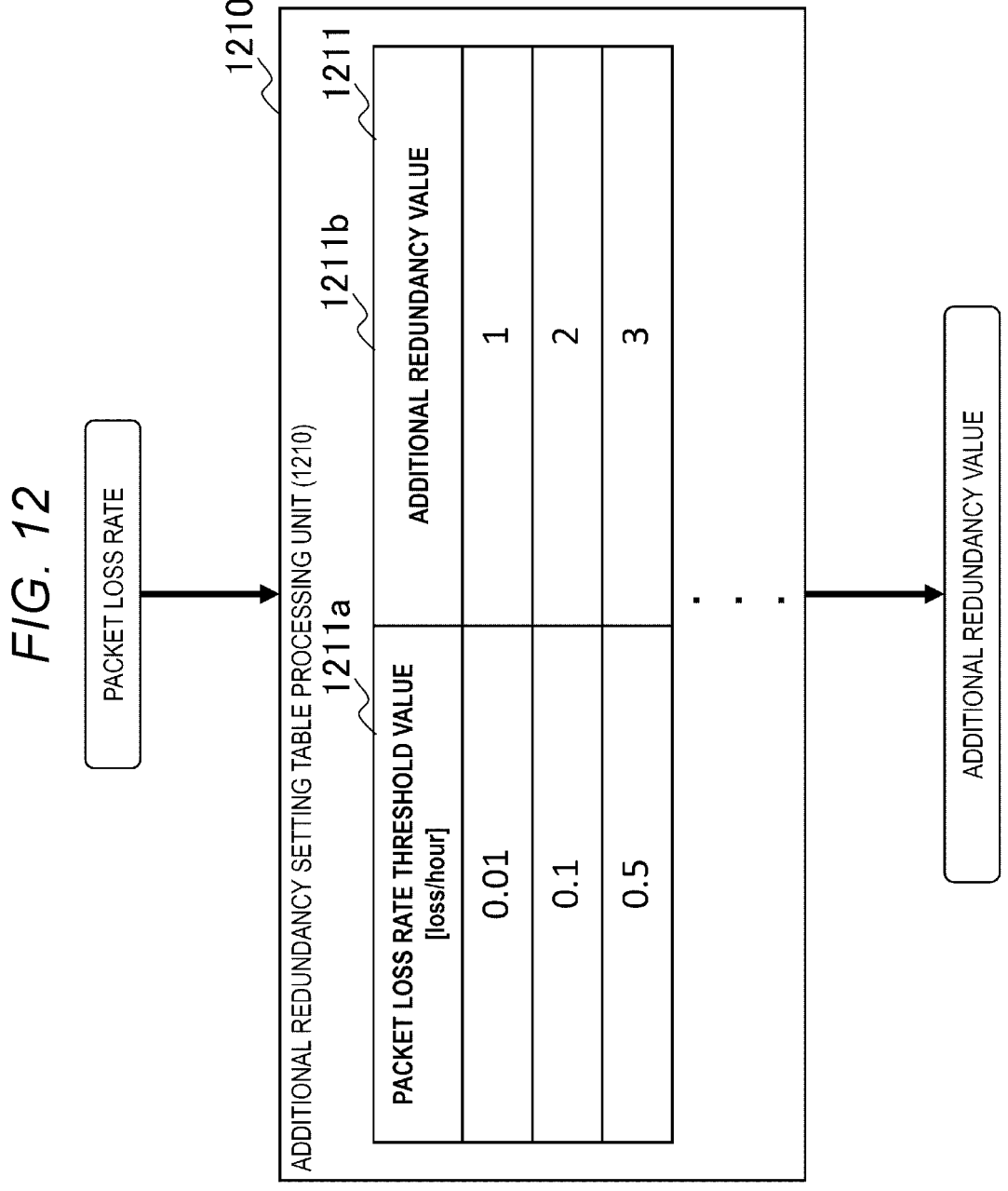
FIG. 12 is a functional configuration diagram of an additional redundancy setting table processing unit according to the first embodiment.

FIG. 12 is a functional configuration diagram of the additional redundancy setting table processing unit according to the first embodiment.

The additional redundancy setting table processing unit 1210 executes a process of managing the additional redundancy setting table 1211.

The additional redundancy setting table 1211 is a table storing a correspondence relation between the packet loss rate and an appropriate additional redundancy value, and stores an entry for each threshold value of the packet loss rate. The entry in the additional redundancy setting table 1211 includes items of a packet loss rate threshold value 1211*a* and an additional redundancy value 1211*b*. For the packet loss rate threshold value 1211*a*, a threshold value (packet loss rate threshold value) of the packet loss rate corresponding to the entry is stored. For the additional redundancy value 1211*b*, an additional redundancy value in a case of exceeding the packet loss rate threshold value corresponding to the entry (in a case of being equal to or less than a next larger packet loss rate threshold value of another entry) is stored. Accordingly, the example of FIG. 12 indicates that the additional redundancy value is 0 in a case where the packet loss rate is equal to or less than 0.01, the additional redundancy value is 1 in a case where the packet loss rate is larger than 0.01 and equal to or less than 0.1, and the additional redundancy value is 2 in a case where the packet loss rate is larger than 0.1 and equal to or less than 0.5. In the present embodiment, information indicating the relation between the packet loss rate and the additional redundancy value is used, but the present invention is not limited thereto, and information indicating a relation between the packet loss rate and the redundancy may be used.

Figure 13:
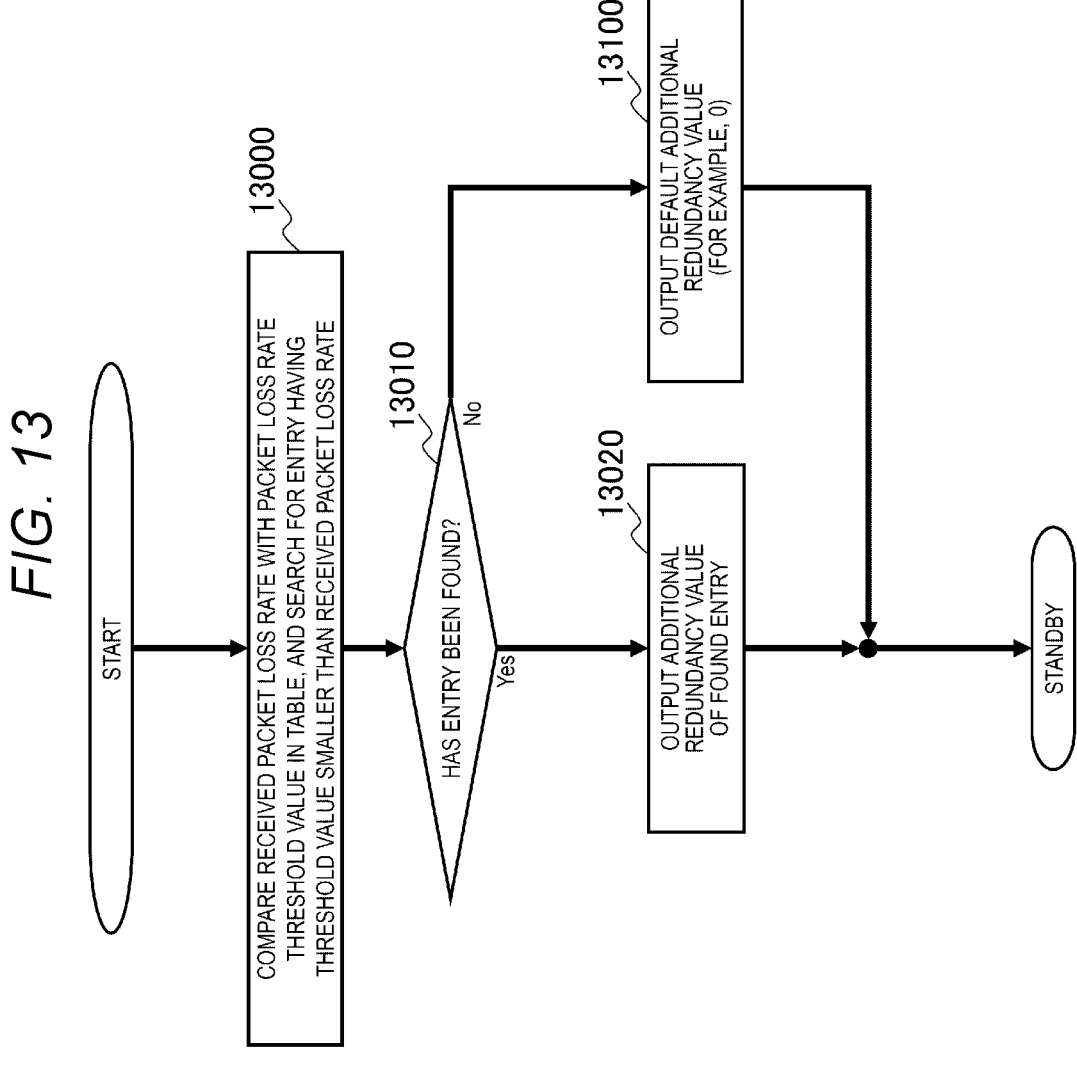
FIG. 13 is a flowchart of a process of an additional redundancy setting table according to the first embodiment.

FIG. 13 is a flowchart of a process of the additional redundancy setting table according to the first embodiment.

The process of the additional redundancy setting table is executed in a case where the packet loss rate is received.

The additional redundancy setting table processing unit 1210 compares the received packet loss rate with the packet loss rate threshold value of the additional redundancy setting table 1211, and searches for an entry having a threshold value smaller than the received packet loss rate (13000). In a case where there are a plurality of entries each having a threshold value smaller than the received packet loss rate, an entry having a maximum threshold value is selected from those entries.

Next, the additional redundancy setting table processing unit 1210 determines whether an entry has been found in the search (13010).

As a result, in a case where an entry is found in the search (Yes in 13010), the additional redundancy setting table processing unit 1210 outputs an additional redundancy value of the found entry to the processing controller 1201 (13020), and returns to the standby state.

On the other hand, in a case where no entry is found in the search (No in 13010), the additional redundancy setting table processing unit 1210 outputs a default additional redundancy value (for example, 0) (13100), and returns to the standby state.

Next, a setting screen for setting the additional redundancy setting table 1211 and the like will be described.

Figure 14:
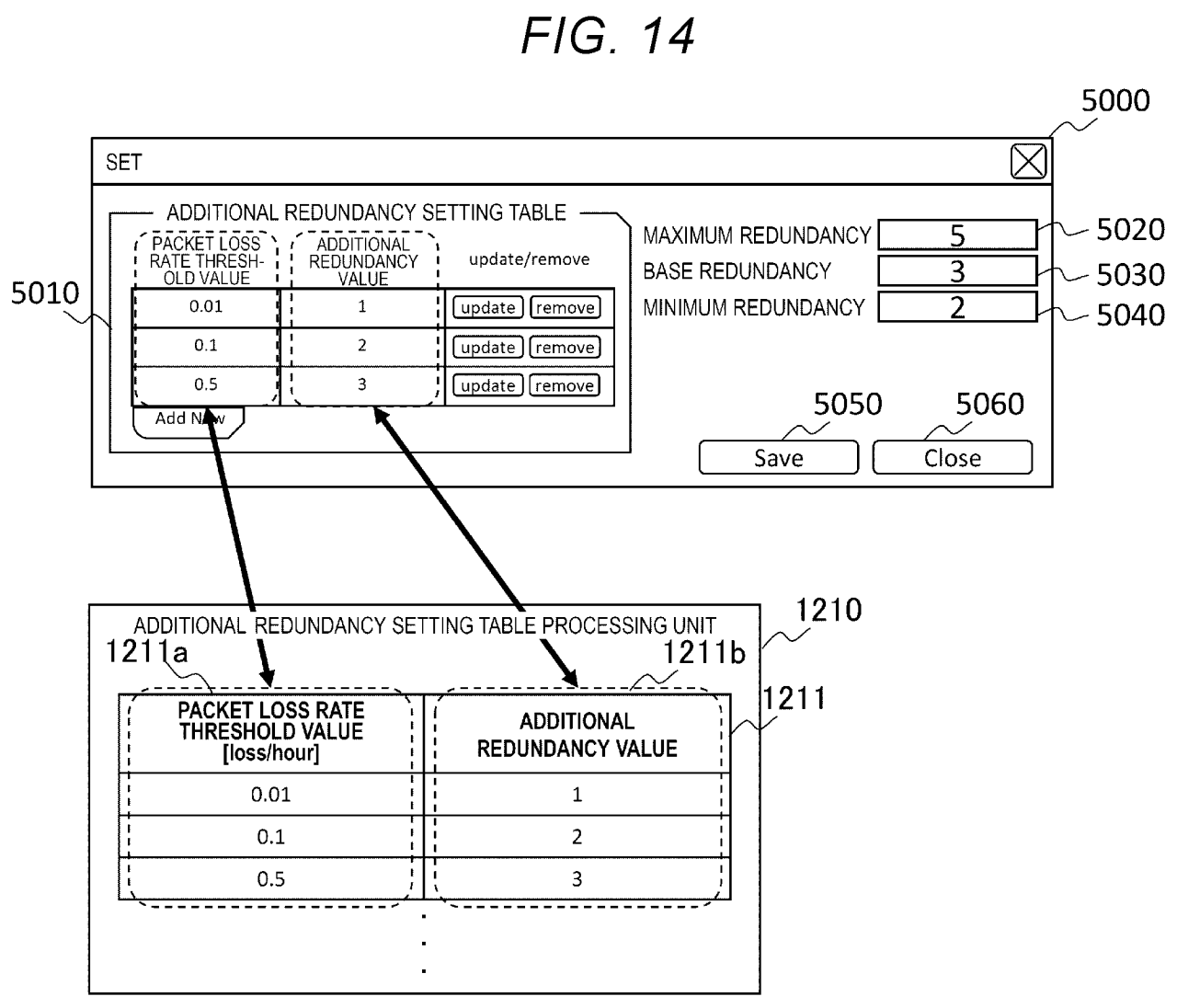

FIG. 14 is a diagram illustrating the setting screen according to the first embodiment.

A setting screen 5000 includes an additional redundancy setting table setting interface 5010, a maximum redundancy setting interface 5020, a base redundancy setting interface 5030, a minimum redundancy setting interface 5040, a Save button 5050, and a Close button 5060.

The additional redundancy setting table setting interface 5010 includes an input area for inputting a value corresponding to each item (packet loss rate threshold value 1211*a* and additional redundancy value 1211*b*) of the additional redundancy setting table 1211. The maximum redundancy setting interface 5020 includes an area for inputting a maximum redundancy to be set in the register 1230. The base redundancy setting interface 5030 includes an area for inputting a base redundancy to be set in the register 1220. The minimum redundancy setting interface 5040 includes an area for inputting a minimum redundancy to be set in the register 1010.

The Save button 5050 is a button for receiving an instruction to set each value set on the setting screen 5000 to each setting destination (storage destination). When the Save button 5050 is pressed, the additional redundancy setting table processing unit 1210 stores a value of each item input to the additional redundancy setting table setting interface 5010 in the additional redundancy setting table 1211. The Close button 5060 is a button for receiving an instruction to close the setting screen 5000, and when the Close button 5060 is pressed, the setting screen 5000 is closed.

In the present embodiment, values to the additional redundancy setting table 1211 and the like are set using the setting screen 5000 similar to a graphical user interface (GUI), but a method of setting the values to the additional redundancy setting table 1211 and the like is not limited thereto, and the values may be set using, for example, a command line interface (CLI).

Second Embodiment

Next, a computer system according to a second embodiment will be described. The second embodiment is an example of a computer system that can cope with a case where there are a plurality of applications (target applications) for which the redundancy is dynamically adjusted.

In the case where there are a plurality of target applications for which the redundancy is dynamically adjusted, the plurality of applications share a same communication system 300, so that it is necessary to arbitrate an increase in redundancy among the plurality of applications so as not to exceed a maximum bandwidth usable in the communication system 300. Therefore, a computer system 1B according to the second embodiment has a function of arbitrating an increase in redundancy among a plurality of applications with respect to the computer system 1A according to the first embodiment.

Figure 15:
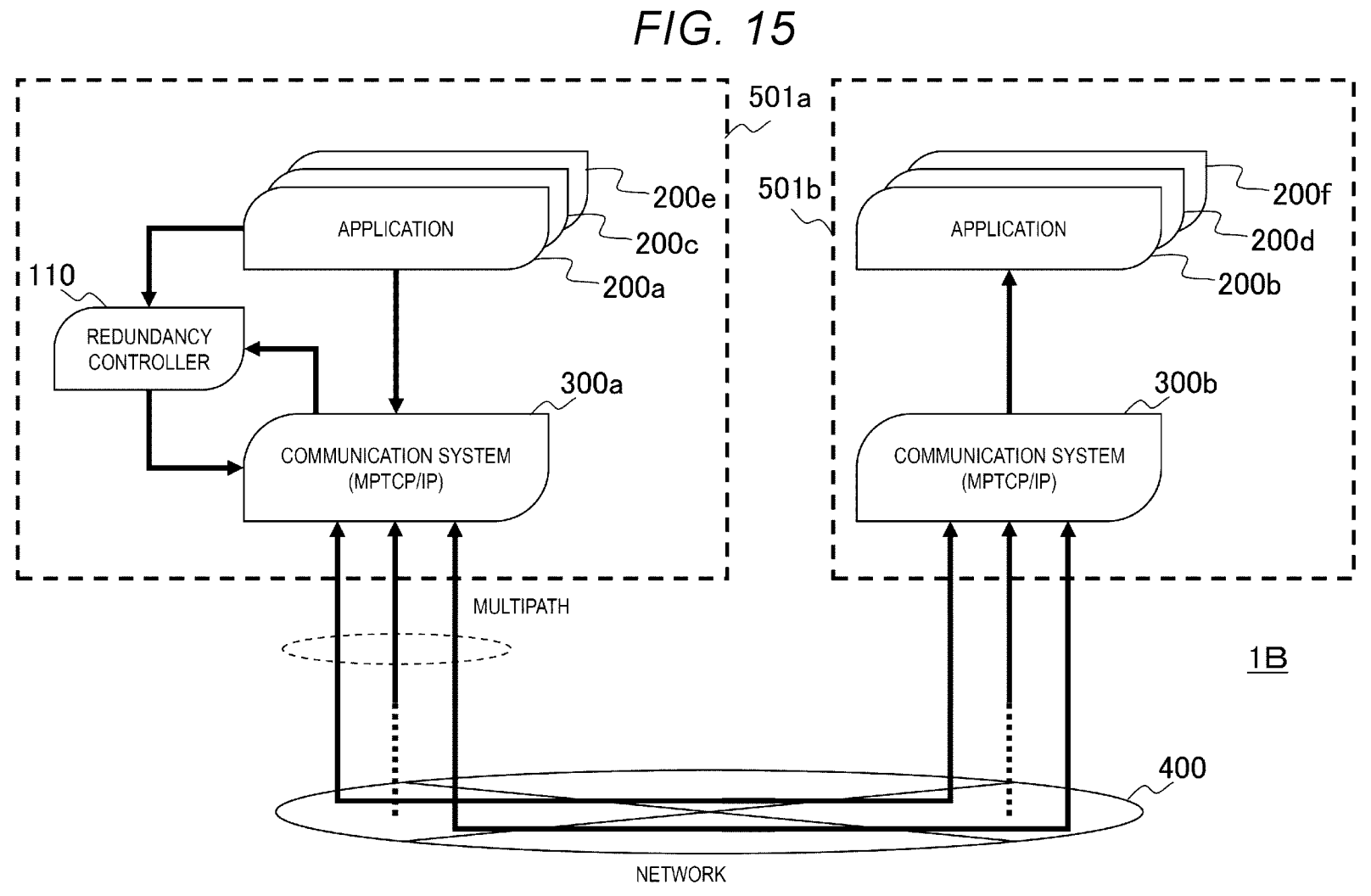

FIG. 15 is a configuration diagram of the computer system according to the second embodiment. Functional portions similar to those of the computer system 1A according to the first embodiment are denoted by the same reference numerals.

The computer system 1B includes a plurality of servers 501 (501a and 501b), and the server 501a and the server 501b are connected via the network 400. A hardware configuration of the server 501 is the same as that of the server 500 illustrated in FIG. 1, and in the following description, the same reference numerals as those of the server 500 are used for the hardware configuration.

The server 501a executes a plurality of applications 200 (200a, 200c, and 200e) for which the redundancy is dynamically adjusted. The server 501a includes a redundancy controller 110 instead of the redundancy controller 100 in the server 500a. The server 501a may execute one or more applications (non-target applications) for which the redundancy is not dynamically adjusted, and the communication system 300a may execute communication processing of the non-target applications. The redundancy controller 110 is mainly implemented by the CPU 510 executing a program. The server 501b includes a plurality of applications 200 (200b, 200d, and 200f) and a communication system 300b.

For example, the application 200a (200c and 200e) receives an I/O request for data with respect to the server 501b from a terminal (not illustrated), and executes data exchange of target data with the application 200b (200d and 200f) of the server 501b. FIG. 15 illustrates an example in which the application 200a transmits data to the application 200b, the application 200c transmits data to the application 200d, and the application 200e transmits data to the application 200f.

The redundancy controller 110 dynamically adjusts redundancy in communication for each application.

Next, the redundancy controller 110 will be described in detail.

Figure 16:
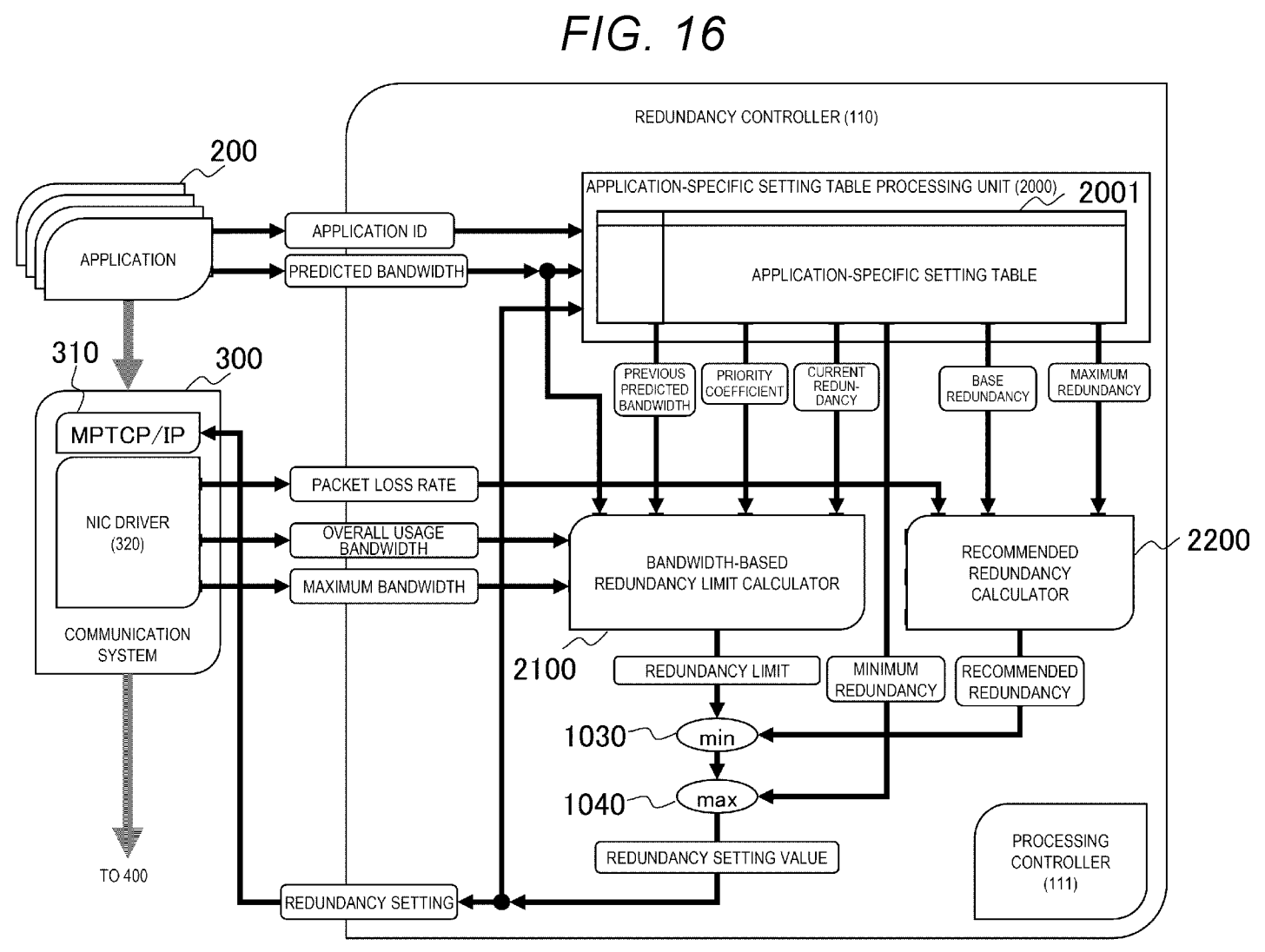

FIG. 16 is a functional configuration diagram of the redundancy controller according to the second embodiment. In FIG. 16, the same components as those of the redundancy controller 100 according to the first embodiment are denoted by the same reference numerals.

The redundancy controller 110 does not include the registers 1010 and 1020 in the redundancy controller 100, newly includes an application-specific setting table processing unit 2000, includes a processing controller 111 instead of the processing controller 101, includes a bandwidth-based redundancy limit calculator 2100 instead of the bandwidth-based redundancy limit calculator 1100, and includes a recommended redundancy calculator 2200 instead of the recommended redundancy calculator 1200.

In the present embodiment, the application 200 is implemented to output an application identifier (application ID) in addition to the predicted bandwidth, and the redundancy controller 110 receives the application identifier and the predicted bandwidth from the application 200.

The bandwidth-based redundancy limit calculator 2100 calculates a redundancy limit in a bandwidth usable by the communication system 300, and outputs the redundancy limit. Details of the bandwidth-based redundancy limit calculator 2100 will be described later.

The recommended redundancy calculator 2200 calculates a recommended redundancy at the time of transmitting data of the application 200, and outputs the recommended redundancy. Details of the recommended redundancy calculator 2200 will be described later.

The application-specific setting table processing unit 2000 executes a management of an application-specific setting table 2001 that stores setting information specific to each application 200. Details f the application-specific setting table processing unit 2000 will be described later.

Next, a redundancy control process by the redundancy controller 110 will be described.

FIG. 17 is a flowchart of the redundancy control process according to the second embodiment.

The redundancy control process is executed, for example, in a case where the redundancy controller 110 receives the application identifier and the predicted bandwidth from the application 200. The redundancy control process is not limited thereto, and may be executed in a case where there is a change in a packet loss rate or in a case where an overall usage bandwidth changes by a certain amount or more.

First, the processing controller 111 acquires the maximum bandwidth, the overall usage bandwidth, and the packet loss rate from the NIC driver 320 (10000).

Next, the processing controller 111 transfers the acquired application identifier and predicted bandwidth to the application-specific setting table processing unit 2000, and receives an output (previous predicted bandwidth, priority coefficient, current redundancy, base redundancy, and maximum redundancy) from the application-specific setting table processing unit 2000 (20010).

Next, the processing controller 111 transfers the acquired predicted bandwidth, maximum bandwidth, overall usage bandwidth, current redundancy, priority coefficient, and previous predicted bandwidth to the bandwidth-based redundancy limit calculator 2100, and receives an output (redundancy limit) from the bandwidth-based redundancy limit calculator 2100 (20015).

Next, the processing controller 111 transfers the packet loss rate, the base redundancy, and the maximum redundancy to the recommended redundancy calculator 2200, and receives an output (recommended redundancy) from the recommended redundancy calculator 2200 (20020).

Next, the processing controller 111 inputs the redundancy limit and the recommended redundancy to the minimum operator 1030. The minimum operator 1030 determines a smaller value of the redundancy limit and the recommended redundancy as a candidate redundancy and outputs the determined value to the processing controller 111 (20030).

Next, the processing controller 111 inputs the candidate redundancy and the minimum redundancy to the maximum operator 1040. The maximum operator 1040 determines a larger value of the candidate redundancy and the minimum redundancy as the redundancy setting value and outputs the determined value to the processing controller 111 (20040).

Next, the processing controller 111 sets the redundancy setting value as the redundancy to be used in the MPTCP/IP driver 310 of the communication system 300, transfers the redundancy setting value to the application-specific setting table processing unit 2000, updates the current redundancy (20050), and brings the redundancy controller 110 into a standby state. Accordingly, in the communication system 300, communication is executed after redundancy is executed in accordance with the setting value.

Next, the bandwidth-based redundancy limit calculator 2100 will be described in detail.

FIG. 18 is a functional configuration diagram of the bandwidth-based redundancy limit calculator according to the second embodiment. The same components as those of the bandwidth-based redundancy limit calculator 1100 according to the first embodiment are denoted by the same reference numerals.

The bandwidth-based redundancy limit calculator 2100 does not include the delay register 1110, further includes a multiplier 2110, includes a processing controller 2101 instead of the processing controller 1101, and includes an integer divider 2130 instead of the integer divider 1140.

The processing controller 2101 receives various kinds of information (maximum bandwidth, overall usage bandwidth, current redundancy, predicted bandwidth, priority coefficient, and previous predicted bandwidth) input from the processing controller 111, and integrally controls exchange of processing and information by each unit provided in the bandwidth-based redundancy limit calculator 2100.

The multiplier 2110 multiplies the input predicted bandwidth and priority coefficient to calculate a priority-considered bandwidth which is a bandwidth for the application 200 (target application) in consideration of the priority of the application, and outputs the priority-considered bandwidth.

The integer divider 2130 divides a usable bandwidth by the priority-considered bandwidth, obtains an integer value by rounding down a fraction below a decimal point of a quotient thereof, and outputs the integer value as the redundancy limit.

Next, a redundancy limit calculation process executed by the bandwidth-based redundancy limit calculator 2100 will be described.

FIG. 19 is a flowchart of the redundancy limit calculation process according to the second embodiment.

In FIG. 19, processing similar to those of the redundancy limit calculation process according to the first embodiment are denoted by the same reference numerals.

The redundancy limit calculation process is executed, for example, in a case where the bandwidth-based redundancy limit calculator 2100 acquires a calculation instruction (maximum bandwidth, overall usage bandwidth, current redundancy, predicted bandwidth, priority coefficient, and previous predicted bandwidth) from the processing controller 111.

First, the processing controller 2101 executes steps 11010, 11020, and 11030 in the same manner as the processing controller 1101.

Next, the processing controller 2101 inputs the predicted bandwidth and the priority coefficient to the multiplier 2110. The multiplier 2110 multiplies the predicted bandwidth by the priority coefficient to calculate a priority-considered bandwidth, and outputs the priority-considered bandwidth to the processing controller 2101 (21030).

Next, the processing controller 2101 inputs the usable bandwidth and the priority-considered bandwidth to the integer divider 2130. The integer divider 2130 divides the usable bandwidth by the priority-considered bandwidth, obtains an integer value by rounding down a fraction below a decimal point of a quotient thereof, and outputs the integer value as the redundancy limit to the processing controller 2101 (21040).

Next, the processing controller 2101 outputs the redundancy limit to the processing controller 111 (21050), and brings the bandwidth-based redundancy limit calculator 2100 into a standby state. According to the redundancy limit calculation process, it is possible to appropriately calculate the redundancy limit, which is the upper limit of the redundancy possible at the time of transmitting the data of the predicted bandwidth, in a communication state at that time in consideration of the priority of the application.

Next, the recommended redundancy calculator 2200 will be described in detail.

Figure 20:
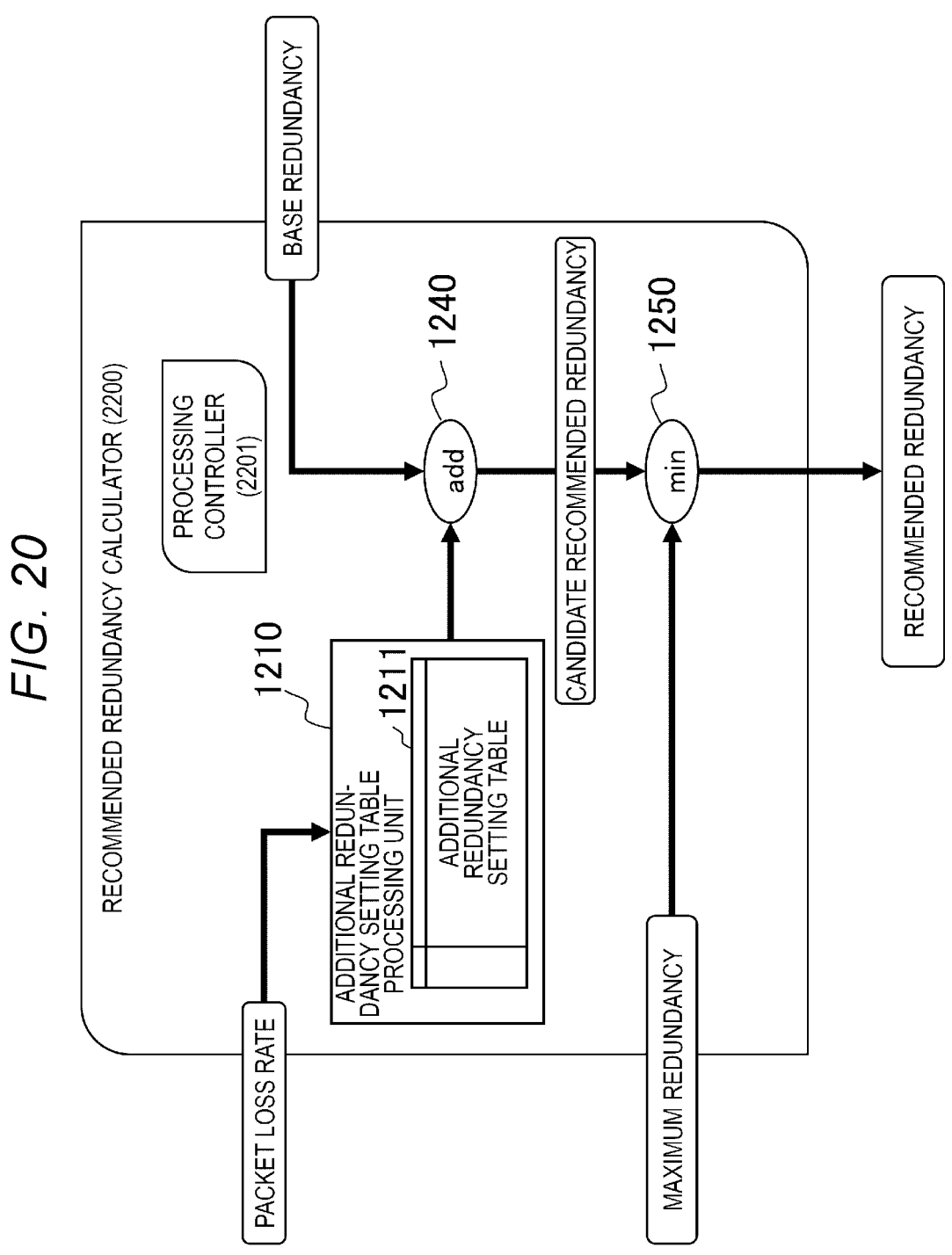
FIG. 20 is a functional configuration diagram of a recommended redundancy calculator according to the second embodiment.

FIG. 20 is a functional configuration diagram of the recommended redundancy calculator according to the second embodiment. The same components as those of the recommended redundancy calculator 1200 according to the first embodiment are denoted by the same reference numerals.

The recommended redundancy calculator 2200 does not include the registers 1220 and 1230, and includes a processing controller 2201 instead of the processing controller 1201.

The processing controller 2201 receives various kinds of information (packet loss rate, maximum redundancy, and base redundancy) input from the processing controller 111, and integrally controls exchange of processing and information by each unit provided in the recommended redundancy calculator 2200.

Next, a recommended redundancy calculation process by the recommended redundancy calculator 2200 will be described.

FIG. 21 is a flowchart of the recommended redundancy calculation process according to the second embodiment. In FIG. 21, processing steps similar to those of the recommended redundancy calculation process according to the first embodiment are denoted by the same reference numerals.

The recommended redundancy calculation process is executed, for example, in a case where the recommended redundancy calculator 2200 acquires a calculation instruction (packet loss rate, base redundancy, and maximum redundancy) from the processing controller 111.

First, the processing controller 2201 executes step 12000 in the same manner as the processing controller 1201.

Next, the processing controller 2201 inputs the base redundancy and the additional redundancy value to the adder 1240. The adder 1240 adds the base redundancy and the additional redundancy value to calculate a candidate recommended redundancy, and outputs the candidate recommended redundancy to the processing controller 2201 (22010).

Next, the processing controller 2201 inputs the maximum redundancy and the candidate recommended redundancy to the minimum operator 1250. The minimum operator 1250 outputs a smaller value of the maximum redundancy and the candidate recommended redundancy to the processing controller 2201 as the recommended redundancy (22020).

Next, the processing controller 2201 outputs the recommended redundancy to the processing controller 111 (22030), and brings the recommended redundancy calculator 2200 into a standby state. According to the recommended redundancy calculation process, it is possible to calculate a recommended redundancy which is an appropriate redundancy in a case where the packet loss rate is taken into consideration, and it is possible to reduce a network load and power consumption.

Next, the application-specific setting table processing unit 2000 will be described in detail.

Figure 22:
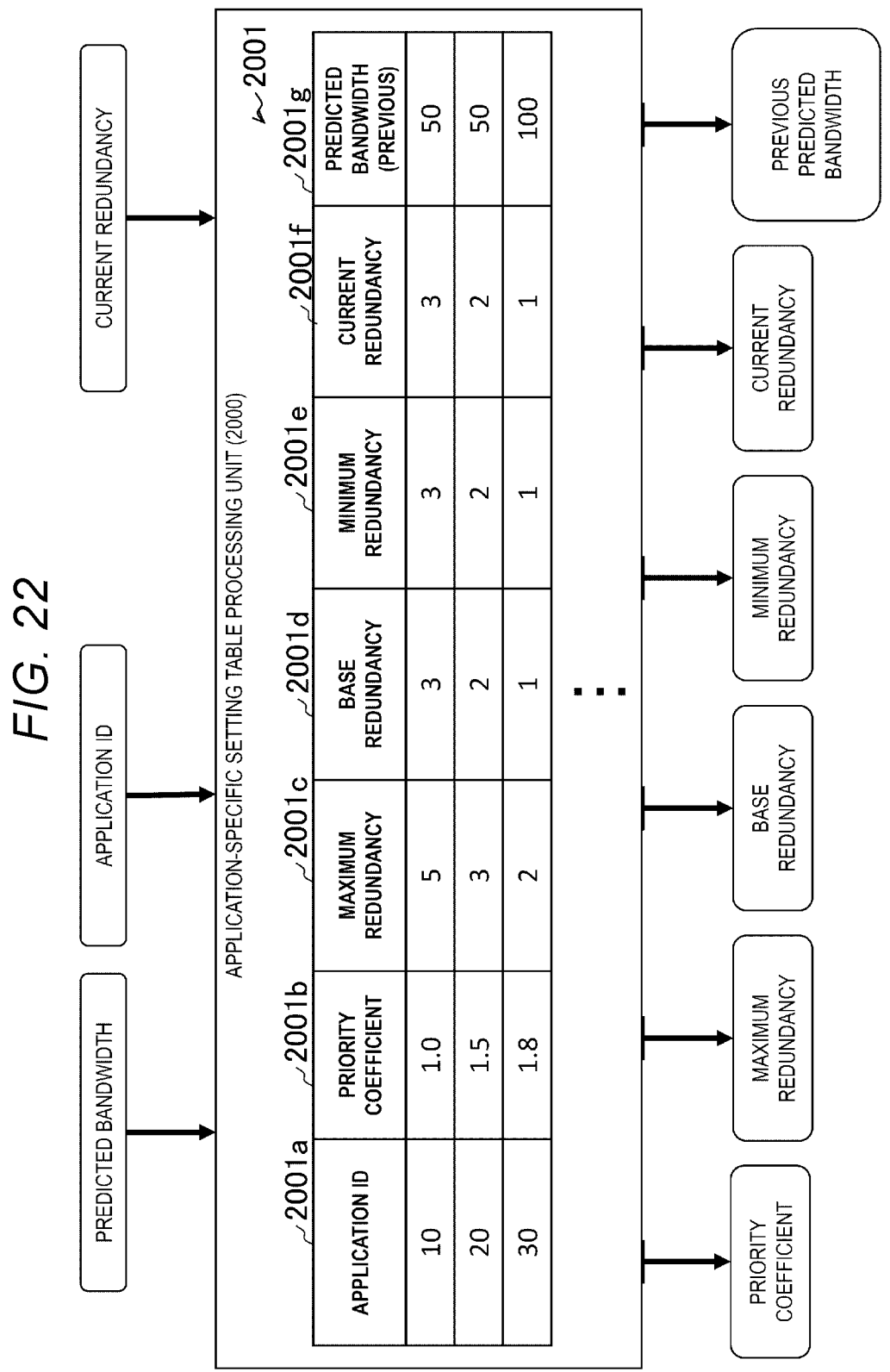
FIG. 22 is a functional configuration diagram of an application-specific setting table processing unit according to the second embodiment.

FIG. 22 is a functional configuration diagram of the application-specific setting table processing unit according to the second embodiment.

The application-specific setting table processing unit 2000 executes a process of managing the application-specific setting table 2001.

The application-specific setting table 2001 is a table for managing various kinds of information for each application, and stores an entry for each application. The entry of the application-specific setting table 2001 includes items of an application ID 2001*a*, a priority coefficient 2001*b*, a maximum redundancy 2001*c*, a base redundancy 2001*d*, a minimum redundancy 2001*e*, a current redundancy 2001*f*, and a predicted bandwidth (previous) 2001*g*.

The application ID 2001*a* stores application identification information of an application corresponding to the entry. The priority coefficient 2001*b* stores a coefficient of priority (priority coefficient: communication priority) for a bandwidth used by the application corresponding to the entry. The priority coefficient is, for example, 1.0 for an application having a highest priority (bandwidth can be preferentially used), and the priority coefficient increases as the priority decreases. The maximum redundancy 2001*c* stores a maximum value of a redundancy (maximum redundancy) for the application corresponding to the entry. The base redundancy 2001*d* stores a base value of the redundancy (base redundancy) in the application corresponding to the entry. The minimum redundancy 2001*e* stores a minimum value of the redundancy (minimum redundancy) of the application corresponding to the entry. The current redundancy 2001*f* stores a redundancy at the current (current redundancy) set for the application corresponding to the entry. The predicted bandwidth (previous) 2001*g* stores a previous predicted bandwidth of the application corresponding to the entry.

Figure 23:
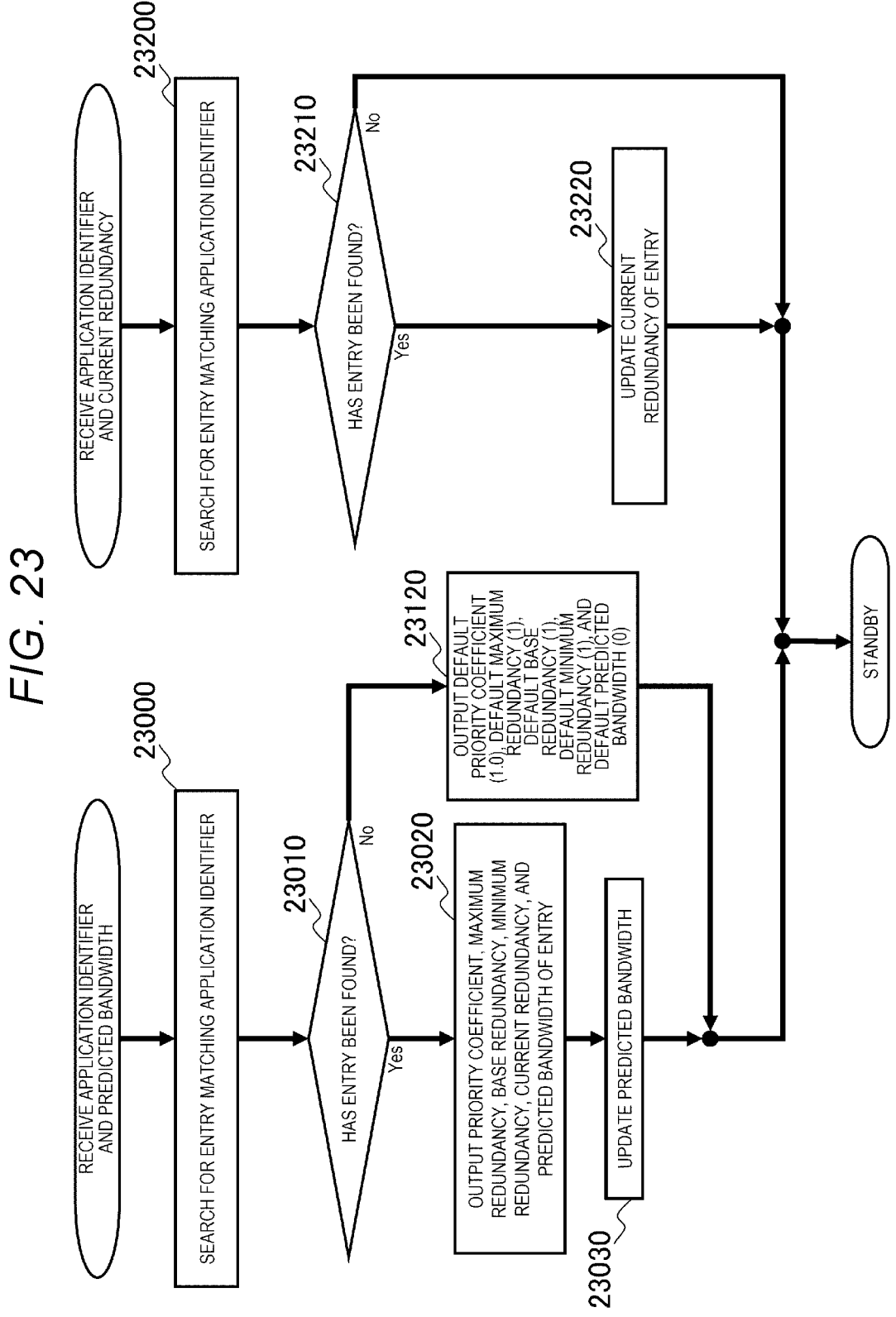
FIG. 23 is a flowchart of a process of an application-specific setting table according to the second embodiment.

FIG. 23 is a flowchart of a process of the application-specific setting table according to the second embodiment.

The process of the application-specific setting table is executed by the application-specific setting table processing unit 2000 in a case where the application identifier and the predicted bandwidth are received or in a case where the application identifier and the current redundancy are received. The application-specific setting table processing unit 2000 executes steps 23000 to 23120 in the case where the application identifier and the predicted bandwidth are received, and executes steps 23200 to 23220 in the case where the application identifier and the current redundancy are received.

In the case where the application identifier and the predicted bandwidth are received, the application-specific setting table processing unit 2000 searches the application-specific setting table 2001 for an entry matching the application identifier (23000), and determines whether the entry matching the application identifier is found (23010).

As a result, in a case where the entry matching the application identifier is found (Yes in 23010), the application-specific setting table processing unit 2000 outputs a priority coefficient, a maximum redundancy, a base redundancy, a minimum redundancy, a current bandwidth, and a predicted bandwidth of the found entry to the processing controller 111 (23020), updates the predicted bandwidth of the predicted bandwidth (previous) 2001*g* of this entry to a received predicted bandwidth (23030), and enters a standby state.

On the other hand, in a case where no entry matching the application identifier is found (No in 23010), the application-specific setting table processing unit 2000 outputs a default priority coefficient (for example, 1.0), a default maximum redundancy (for example, 1), a default base redundancy (for example, 1), a default minimum redundancy (for example, 1), and a default predicted bandwidth (for example, 0) to the processing controller 111 (23120), and enters a standby state.

On the other hand, in the case where the application identifier and the current redundancy are received, the application-specific setting table processing unit 2000 searches the application-specific setting table 2001 for an entry matching the application identifier (23200), and determines whether the entry matching the application identifier is found (23210).

As a result, in a case where the entry matching the application identifier is found (Yes in 23210), the application-specific setting table processing unit 2000 updates the current redundancy of the current redundancy 2001*f* of the found entry to a received current redundancy width (23220), and enters a standby state. On the other hand, in a case where no entry matching the application identifier is found (No in 23210), the application-specific setting table processing unit 2000 enters a standby state.

Next, a setting screen for setting the application-specific setting table 2001 will be described.

FIG. 24 is a diagram illustrating the setting screen according to the second embodiment.

A setting screen 5100 includes an application-specific setting table setting interface 5110, a Save button 5120, and a Close button 5130.

The application-specific setting table setting interface 5110 includes an input area for inputting values corresponding to a plurality of items (application ID 2001*a*, priority coefficient 2001*b*, maximum redundancy 2001*c*, base redundancy 2001*d*, and minimum redundancy 2001*e*) set by a user of the application-specific setting table 2001. The Save button 5120 is a button for receiving an instruction to set each value set in the application-specific setting table setting interface 5110 in the application-specific setting table 2001. When the Save button 5120 is pressed, the application-specific setting table processing unit 2000 stores a value of each item input to the application-specific setting table setting interface 5110 in the application-specific setting table 2001. The Close button 5130 is a button for receiving an instruction to close the setting screen 5100, and when the Close button 5130 is pressed, the setting screen 5100 is closed.

In the present embodiment, values to the application-specific setting table 2001 are set using the setting screen 5100 similar to a graphical user interface (GUI), but a method of setting the values to the application-specific setting table 2001 limited thereto, and the values may be set using, for example, a command line interface (CLI).

Third Embodiment

Next, a computer system according to a third embodiment will be described. The third embodiment is an example of a computer system in which there are a plurality of applications for which the redundancy is dynamically adjusted, and the redundancy can be adjusted in consideration of a restriction (for example, a restriction on a communication cost, the communication cost being a metered rate system) other than a bandwidth usable by the application.

The computer system according to the third embodiment includes a redundancy controller 120 (see FIG. 25) instead of the redundancy controller 110 in the computer system 1B according to the second embodiment.

Next, the redundancy controller 120 will be described in detail.

Figure 25:
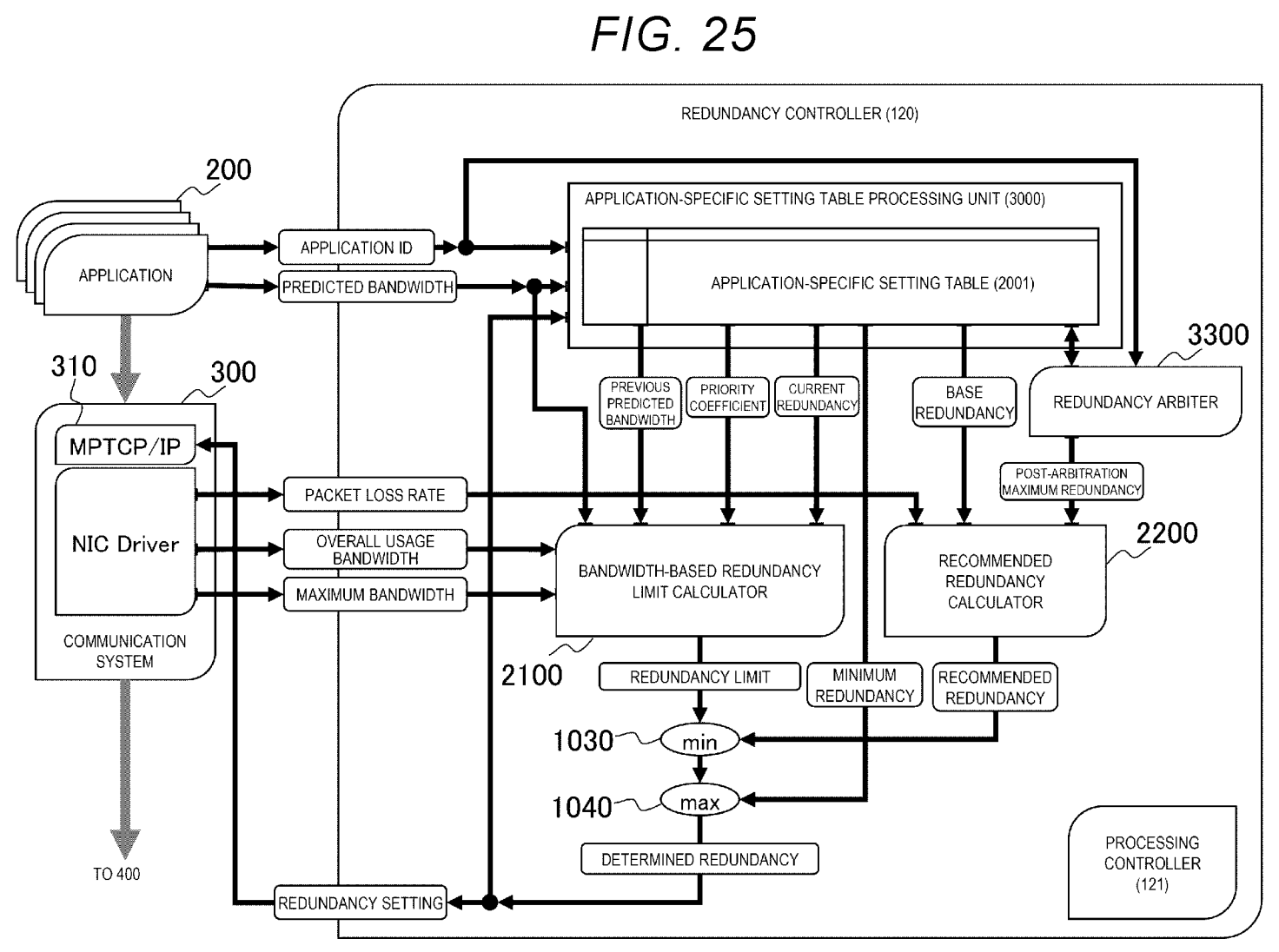

FIG. 25 is a functional configuration diagram of the redundancy controller according to the third embodiment. In FIG. 25, the same components as those of the redundancy controller 110 according to the second embodiment are denoted by the same reference numerals.

The redundancy controller 120 newly includes a redundancy arbiter 3300 in the redundancy controller 110, includes a processing controller 121 instead of the processing controller 111, and includes an application-specific setting table processing unit 3000 instead of the application-specific setting table processing unit 2000.

The redundancy arbiter 3300 executes a process of adjusting the maximum redundancy based on another constraint condition different from a constraint condition of the bandwidth. Details of the redundancy arbiter 3300 will be described later.

The application-specific setting table processing unit 3000 executes a management of the application-specific setting table 2001 that stores setting information specific to each application 200.

Details of the application-specific setting table processing unit 3000 will be described later.

Next, a redundancy control process by the redundancy controller 120 will be described.

FIG. 26 is a flowchart of the redundancy control process according to the third embodiment. Processing steps similar to those of the redundancy control process according to the second embodiment (see FIG. 17) are denoted by the same reference numerals.

The redundancy control process is executed, for example, in a case where the redundancy controller 120 receives the application identifier and the predicted bandwidth from the application 200. The redundancy control process is not limited thereto, and may be executed in a case where there is a change in a packet loss rate or in a case where an overall usage bandwidth changes by a certain amount or more.

First, the processing controller 121 executes a process of step 20000 in the same manner as the processing controller 111.

Next, the processing controller 121 transfers the acquired application identifier and predicted bandwidth to the application-specific setting table processing unit 3000, and receives an output (previous predicted bandwidth, priority coefficient, current redundancy, and base redundancy) from the application-specific setting table processing unit 3000 (30010).

Next, the processing controller 121 executes a process of step 20015 in the same manner as the processing controller 111.

Next, the processing controller 121 sends the application identifier to the redundancy arbiter 3300, and receives an output (post-arbitration maximum redundancy) from the redundancy arbiter 3300 (30020).

Next, the processing controller 121 transfers the packet loss rate, the base redundancy, and the post-arbitration maximum redundancy to the recommended redundancy calculator 2200, and receives an output (recommended redundancy) from the recommended redundancy calculator 2200 (30025).

Next, the processing controller 121 executes processes of steps 20030 and 20040 in the same manner as the processing controller 111.

Next, the processing controller 121 sets the redundancy setting value as the redundancy to be used in the MPTCP/IP driver 310 of the communication system 300, transfers the redundancy setting value to the application-specific setting table processing unit 3000, updates the current redundancy (30050), and brings the redundancy controller 120 into a standby state. Accordingly, in the communication system 300, communication is executed after redundancy is executed in accordance with the setting value.

Next, the redundancy arbiter 3300 will be described in detail.

Figure 27:
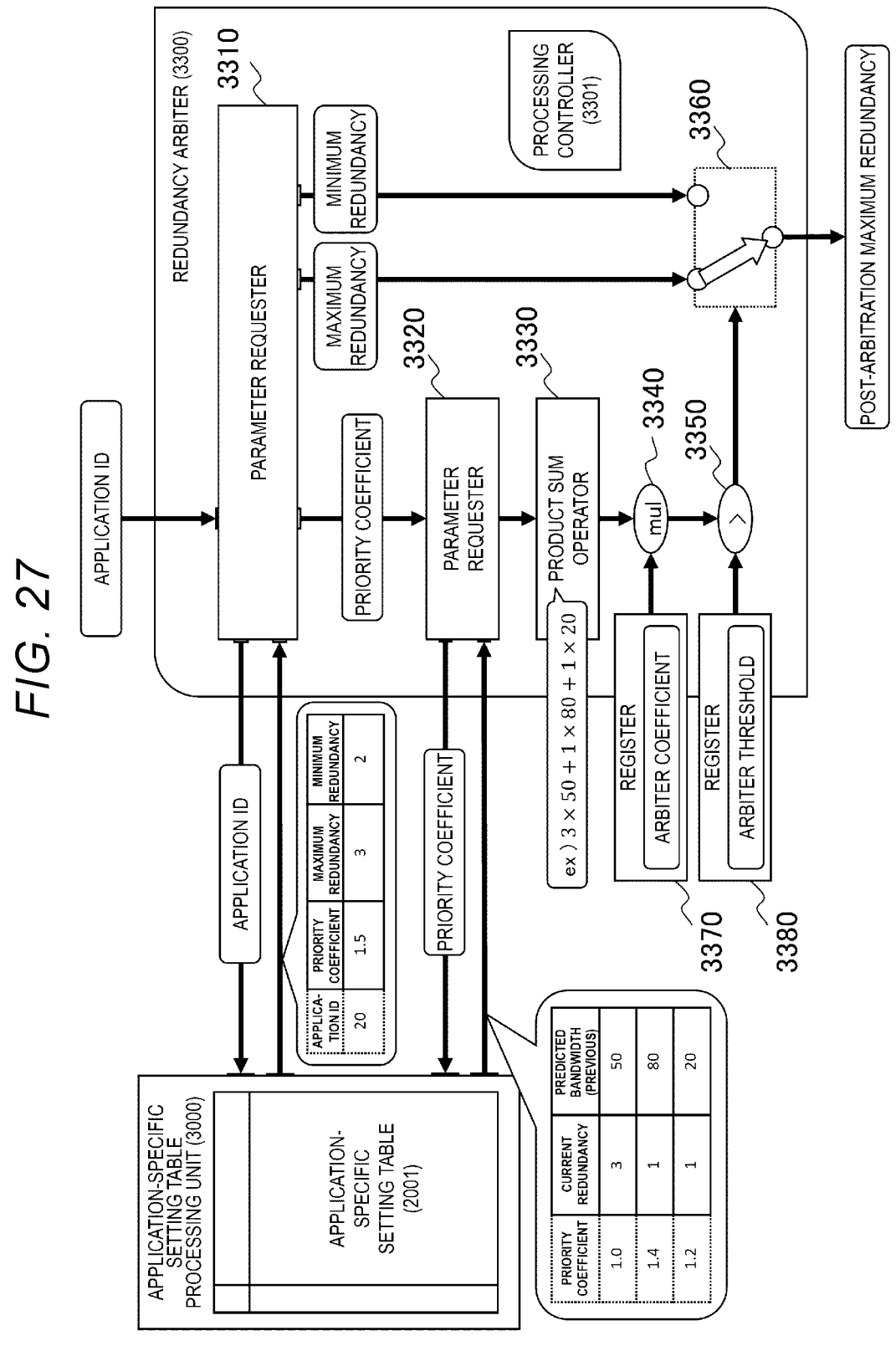
FIG. 27 is a functional configuration diagram of a redundancy arbiter according to the third embodiment.

FIG. 27 is a functional configuration diagram of the redundancy arbiter according to the third embodiment.

The redundancy arbiter 3300 includes a processing controller 3301, a parameter requester 3310, a parameter requester 3320, a product sum operator 3330, a multiplier 3340, a comparator 3350, a selector 3360, a register 3370, and a register 3380.

The processing controller 3301 receives the application identifier input from the processing controller 101, and integrally controls processing by each unit provided in the redundancy arbiter 3300.

The register 3370 stores an arbiter coefficient for calculating a value (arbiter evaluation value) corresponding to a constraint condition (additional constraint condition) used for arbitration based on the bandwidth. In the present embodiment, for example, when the constraint condition is set as a communication charge, the arbiter coefficient is a coefficient for converting the bandwidth into a communication charge per unit time. The register 3380 stores a threshold (arbiter threshold) of the arbiter evaluation value corresponding to the constraint condition. In the present embodiment, when the constraint condition is set as the communication charge, the arbiter threshold is a threshold of the communication charge per unit time (metered rate charge amount threshold).

The parameter requester 3310 transfers the application identifier to the application-specific setting table processing unit 3000, and receives an output (priority coefficient, maximum redundancy, and minimum redundancy) from the application-specific setting table processing unit 3000.

The parameter requester 3320 transfers the priority coefficient to the application-specific setting table processing unit 3000, receives an output (a list of a current redundancy and a previous predicted bandwidth of an application in which a priority coefficient less than the transferred priority coefficient is set) from the application-specific setting table processing unit 3000, and outputs the output.

The product sum operator 3330 receives an input of the list of the current redundancy and the predicted bandwidth of the application, calculates a usage bandwidth of the plurality of applications corresponding to the list, and outputs the usage bandwidth. The multiplier 3340 multiplies the usage bandwidth by the arbiter coefficient to calculate an arbiter evaluation value to be used for comparison with the constraint condition, and outputs the arbiter evaluation value. The comparator 3350 compares which of the arbiter evaluation value and the arbiter threshold is larger, and outputs a comparison result. The selector 3360 determines either the maximum redundancy or the minimum redundancy as the post-arbitration maximum redundancy according to a setting, and outputs the determined value.

Next, a redundancy arbitration process by the redundancy arbiter 3300 will be described.

Figure 28:
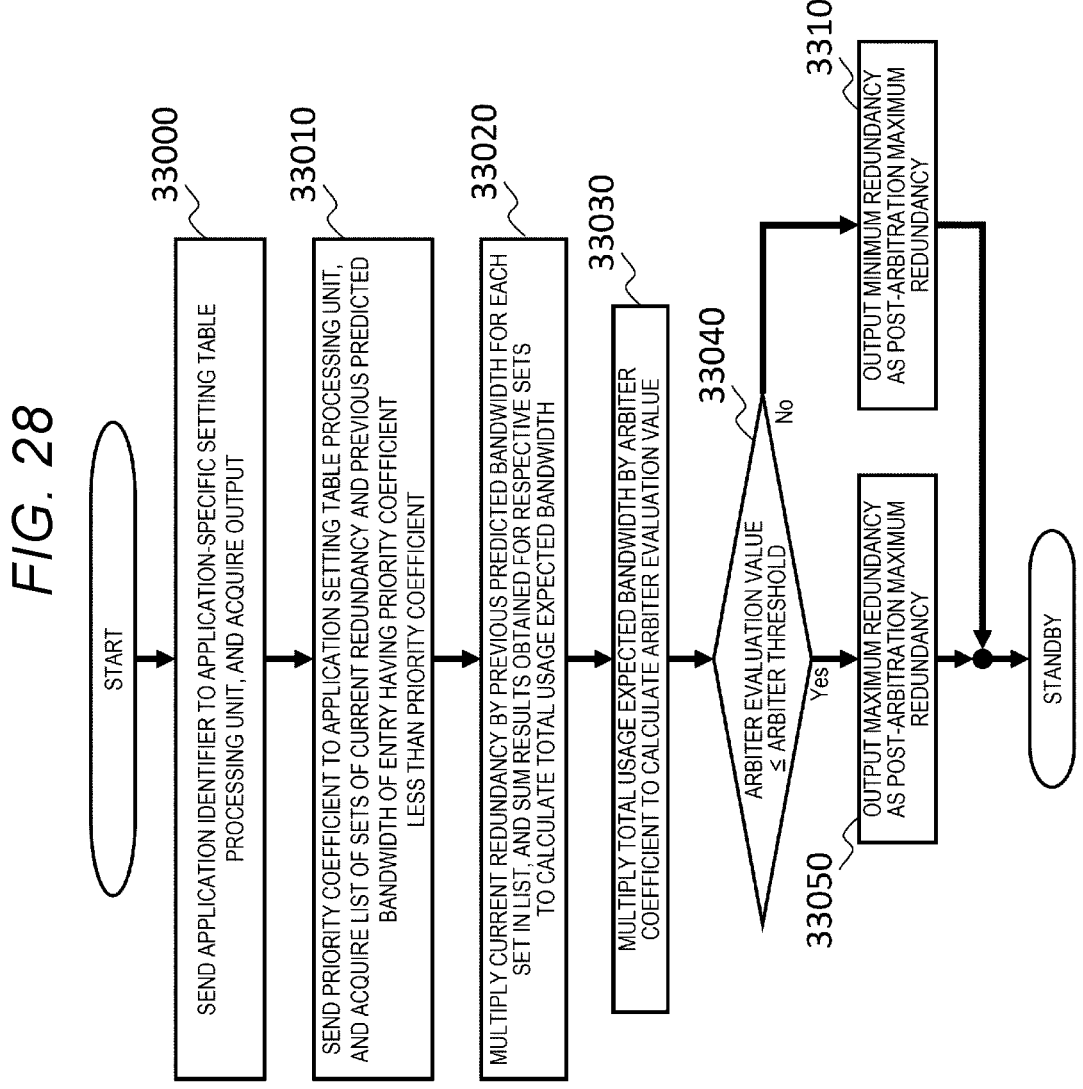
FIG. 28 is a flowchart of a redundancy arbitration process according to the third embodiment.

FIG. 28 is a flowchart of the redundancy arbitration process according to the third embodiment.

The redundancy arbitration process is executed, for example, in a case where the redundancy arbiter 3300 acquires a calculation instruction (application identifier) from the processing controller 121.

First, the processing controller 3301 sends the acquired application identifier to the parameter requester 3310. The parameter requester 3310 sends the application identifier to the application-specific setting table processing unit 3000, and receives an output (priority coefficient, maximum redundancy, and minimum redundancy) from the application-specific setting table processing unit 3000 (33000).

Next, the processing controller 3301 sends the priority coefficient acquired by the parameter requester 3310 to the parameter requester 3320. The parameter requester 3320 sends the priority coefficient to the application-specific setting table processing unit 3000, and acquires an output (a list of sets of current redundancy and previous predicted bandwidth of an application having a priority coefficient less than the transferred priority coefficient (that is, having a high priority)) from the application-specific setting table processing unit 3000 (33010).

Next, the processing controller 3301 transfers the list acquired by the parameter requester 3310 to the product sum operator 3330. The product sum operator 3330 multiplies the current redundancy by the previous predicted bandwidth for each set in the list, and sums results obtained for respective sets to calculate a total usage expected bandwidth (33020). In a case where the list is empty, the product sum operator 3330 sets the total usage expected bandwidth to be 0.

Next, the processing controller 3301 inputs the total usage expected bandwidth to the multiplier 3340, acquires the arbiter coefficient from the register 3370, and inputs the arbiter coefficient to the multiplier 3340. The multiplier 3340 multiplies the total usage expected an bandwidth by the arbiter coefficient to calculate arbiter evaluation value (33030).

Next, the processing controller 3301 inputs the arbiter evaluation value to the comparator 3350, acquires the arbiter threshold from the register 3380, and inputs the arbiter threshold to the comparator 3350. The comparator 3350 determines whether the arbiter evaluation value exceeds the arbiter threshold, and notifies the processing controller 3301 of a determination result thereof (33040).

As a result, in a case where it is determined that the arbiter evaluation value is equal to or less than the arbiter threshold (Yes in 33040), the processing controller 3301 causes the selector 3360 to output the input maximum redundancy as the post-arbitration maximum redundancy (33050), and brings the redundancy arbiter 3300 into a standby state. On the other hand, in a case where it is determined that the arbiter evaluation value exceeds the arbiter threshold (No in 33040), the processing controller 3301 causes the selector 3360 to output the input minimum redundancy as the post-arbitration maximum redundancy (33100), and brings the redundancy arbiter 3300 into a standby state.

According to the redundancy arbiter 3300, in a case where the arbiter evaluation value of the application having a high priority exceeds the arbiter threshold, the post-arbitration maximum redundancy can be set to be the minimum redundancy. In this manner, when the post-arbitration maximum redundancy is set to be the minimum redundancy by the redundancy arbiter 3300, the redundancy setting value output from the maximum operator 1040 of the redundancy controller 120 becomes the minimum redundancy, and the minimum redundancy is set as a redundancy of a target application in the communication system 300. Accordingly, use of the bandwidth can be appropriately prevented based on a condition of the arbiter evaluation value, and the network load and the power consumption can be reduced.

Next, a setting screen for setting the registers 3370 and 3380 will be described.

Figure 29:
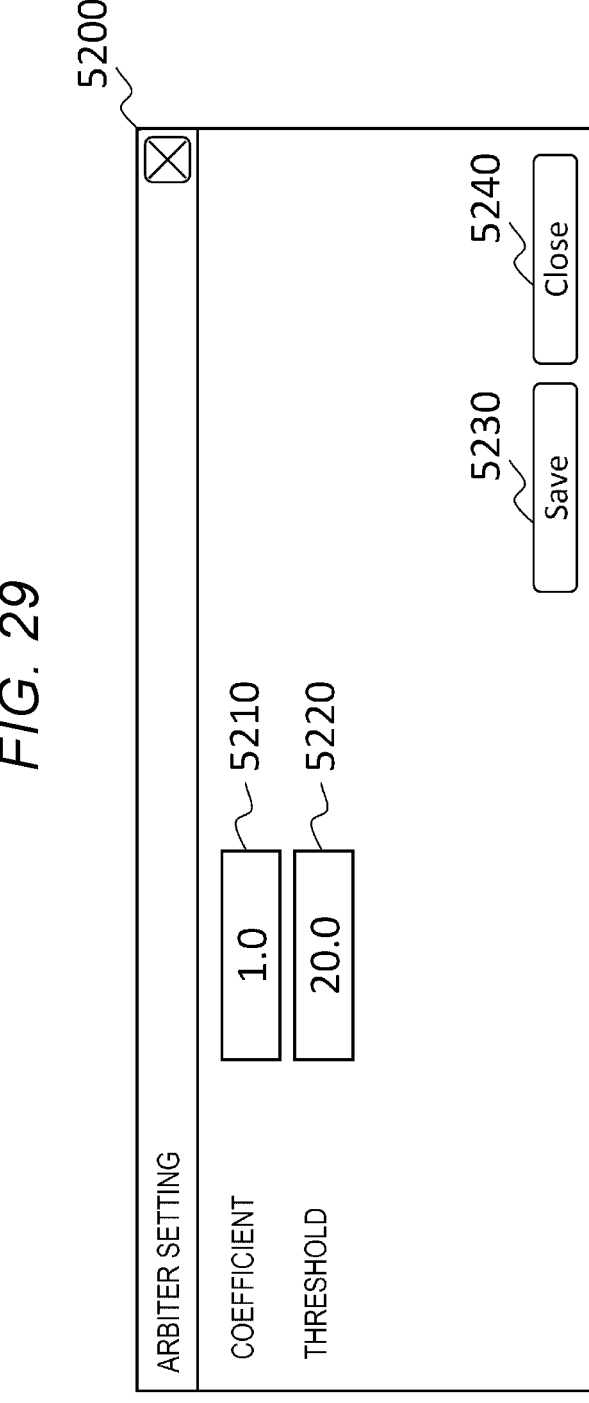
FIG. 29 is a diagram illustrating an arbiter setting screen according to the third embodiment.

FIG. 29 is a diagram illustrating the arbiter setting screen according to the third embodiment.

An arbiter setting screen 5200 includes an arbiter coefficient setting interface 5210, an arbiter threshold setting interface 5220, a Save button 5230, and a Close button 5240.

The arbiter coefficient setting interface 5210 includes an input area for inputting an arbiter coefficient to be set in the register 3370. The arbiter threshold setting interface 5220 includes an area for inputting an arbiter threshold to be set in the register 3380.

The Save button 5230 is a button for receiving an instruction to set each value set on the arbiter setting screen 5200 to each setting destination (storage destination). When the Save button 5230 is pressed, the processing controller 3301 stores a value input to the arbiter coefficient setting interface 5210 in the register 3370, and stores a value input to the arbiter threshold setting interface 5220 in the register 3380. The Close button 5240 is a button for receiving an instruction to close the arbiter setting screen 5200, and when the Close button 5240 is pressed, the arbiter setting screen 5200 is closed. In the present embodiment, values to the register 3370 and the register 3380 are set using the setting screen 5200 similar to a graphical user interface (GUI), but a method of setting the values to the register 3370 and the register 3380 is not limited thereto, and the values may be set using, for example, a command line interface (CLI).

Next, the application-specific setting table processing unit 3000 will be described in detail.

Figure 30:
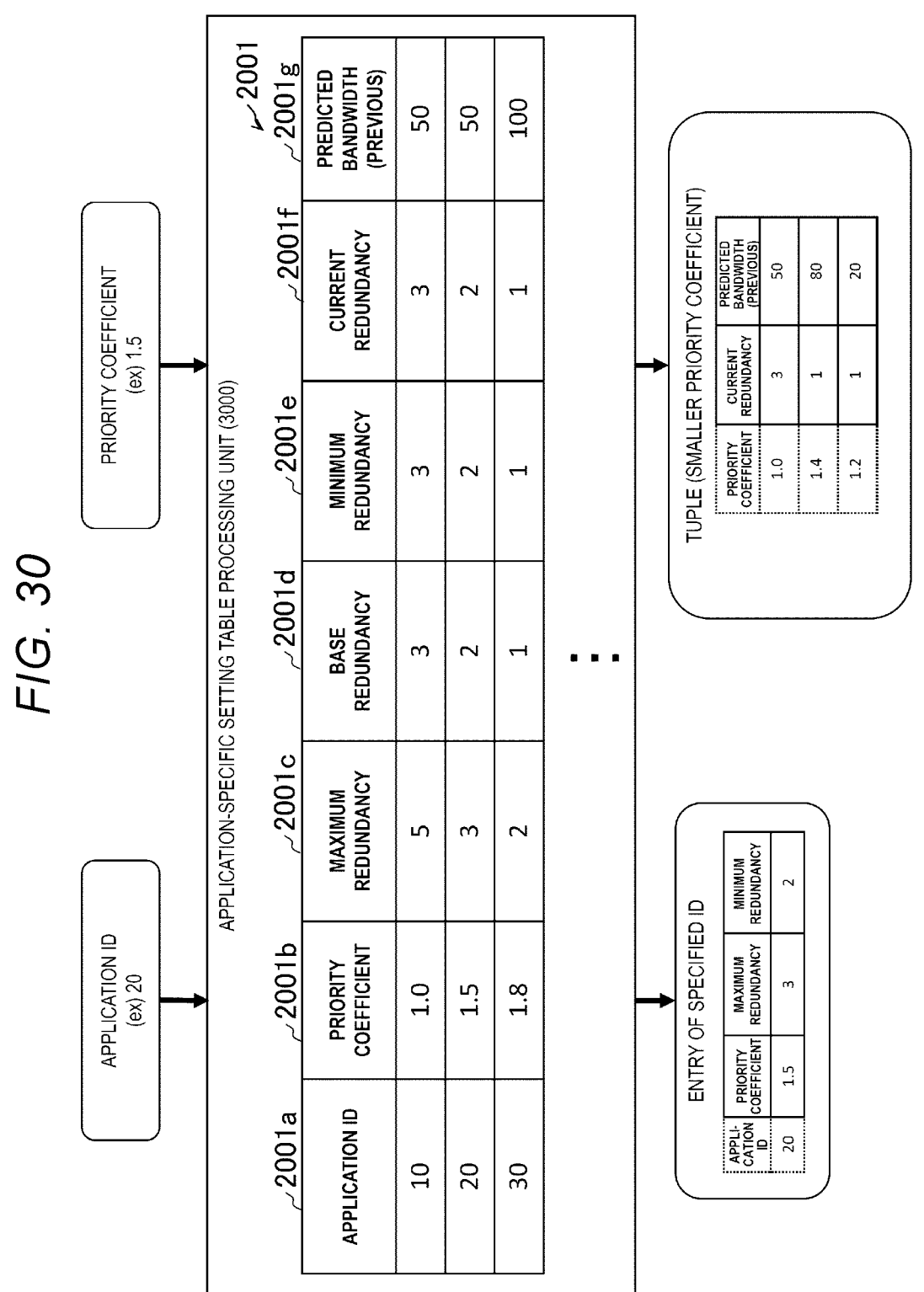
FIG. 30 is a functional configuration diagram of an application-specific setting table processing unit according to the third embodiment.

FIG. 30 is a functional configuration diagram of the application-specific setting table processing unit according to the third embodiment.

The application-specific setting table processing unit 3000 executes a process of managing the application-specific setting table 2001.

For example, when an application identifier of "20" is input, the application-specific setting table processing unit 3000 specifies an entry corresponding to the application identifier of "20" in the application-specific setting table 2001, and outputs a priority coefficient for the priority coefficient 2001$b$, a maximum redundancy for the maximum redundancy 2001$c$, and a minimum redundancy for the minimum redundancy 2001$e$ of the entry.

In addition, for example, when a priority coefficient of "1.5" is input, the application-specific setting table processing unit 3000 specifies an entry having a priority coefficient smaller than the priority coefficient of "1.5" in the application-specific setting table 2001, and outputs a set (tuple) of a current redundancy for the current redundancy 2001$f$ and a previous predicted bandwidth for the predicted bandwidth (previous) 2001$g$ of each entry as a list.

Figure 31:
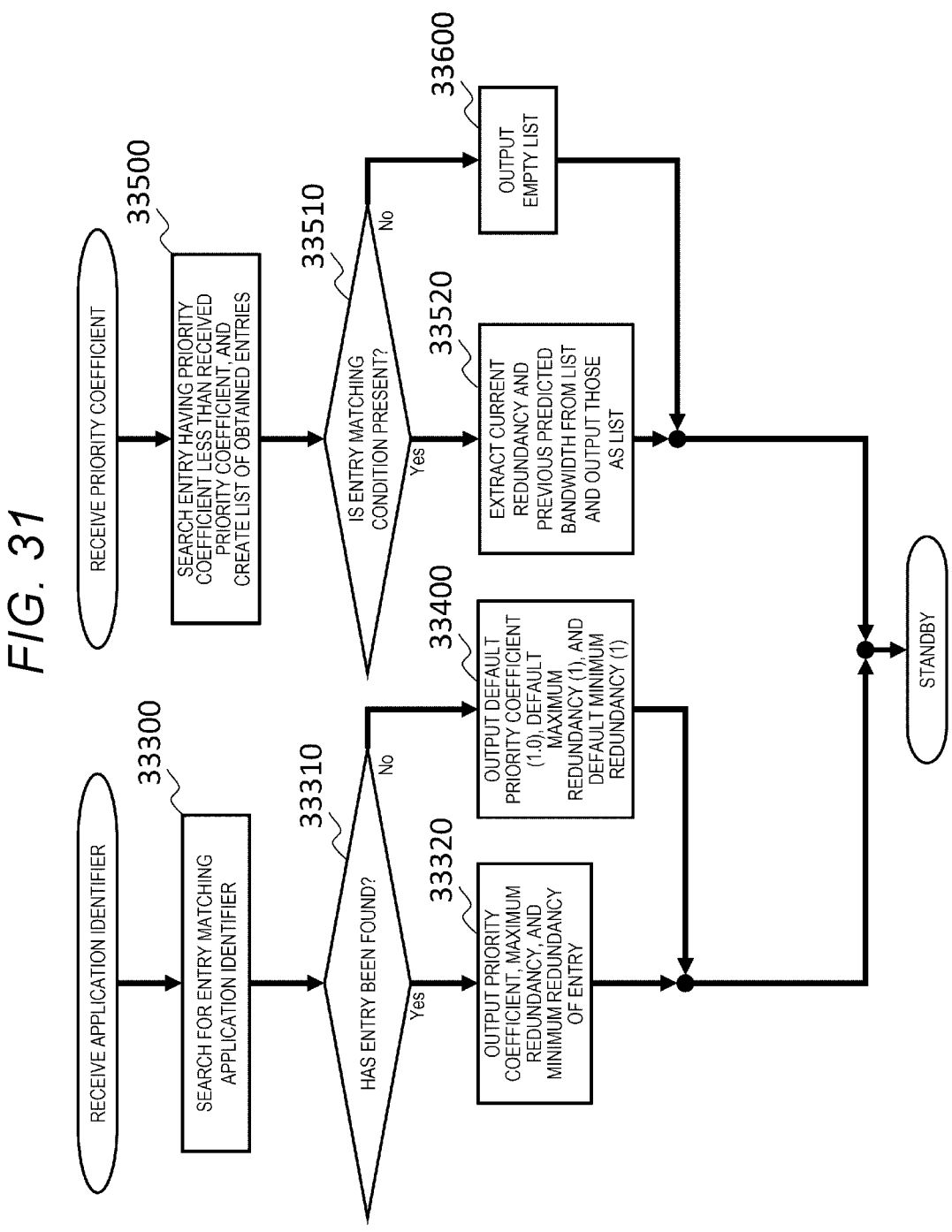
FIG. 31 is a flowchart of a process of an application-specific setting table according to the third embodiment.

FIG. 31 is a flowchart of a process of the application-specific setting table according to the third embodiment.

The process of the application-specific setting table is executed by the application-specific setting table processing unit 3000 in a case where the application identifier is received or in a case where the priority coefficient is received. The application-specific setting table processing unit 3000 executes steps 33300 to 33400 in the case where the application identifier is received, and executes steps 33500 to 33600 in the case where the priority coefficient is received.

In the case where the application identifier is received, the application-specific setting table processing unit 3000 searches the application-specific setting table 2001 for an entry matching the application identifier (33300), and determines whether the entry matching the application identifier is found (33310).

As a result, in a case where the entry matching the application identifier is found (Yes in 33310), the application-specific setting table processing unit 3000 outputs a priority coefficient, a maximum redundancy, and a minimum redundancy of the found entry to the processing controller 121 (33320), and enters a standby state.

On the other hand, in a case where no entry matching the application identifier is found (No in 33310), the application-specific setting table processing unit 3000 outputs a default priority coefficient (for example, 1.0), a default maximum redundancy (for example, 1), and a default minimum redundancy (for example, 1) to the processing controller 121 (33400), and enters a standby state.

On the other hand, in the case where the priority coefficient is received, the application-specific setting table processing unit 3000 searches the application-specific setting table 2001 for an entry having a priority coefficient less than the received priority coefficient (33500), and determines whether an entry matching this condition is found (33510).

As a result, in a case where the entry matching the condition is found (Yes in 33510), the application-specific setting table processing unit 3000 extracts a set of the current redundancy and the previous predicted bandwidth from each entry of a list of search results, outputs the set as a list (33520), and enters a standby state. On the other hand, in a case where no entry matching the condition is found (No in 33510), the application-specific setting table processing unit 3000 outputs an empty list (33600) and enters a standby state.

The present invention is not limited to the above-described embodiment, and can be appropriately modified and implemented without departing from the gist of the present invention.

For example, in the above-mentioned embodiments, some or all of the processes executed by the processor may be executed by a hardware circuit. In addition, the programs in the above-mentioned embodiments may be installed from a program source. The program source may be a program distribution server or a recording medium (for example, a portable recording medium).

What is claimed is:

1. A redundancy control device for setting a redundancy for a communication system allowing communication via a network according to a set redundancy, the redundancy control device comprising:

a storage unit, wherein the storage unit is configured to store a correspondence relation between a communication quality indicator and redundancy specifying information for specifying a redundancy to be set, and a processor, wherein the processor is configured to:

receive, from an application, a use-predicted communication bandwidth which is a communication bandwidth predicted to be used in the network, determine a redundancy limit, which is an upper limit of a redundancy of communication by the application, based on a communication bandwidth usable in the network and the use-predicted communication bandwidth, set, in the communication system, a redundancy equal to or less than the determined redundancy limit as the redundancy of the communication by the application, acquire a communication quality indicator in the network, determine, based on the communication quality indicator, a recommended redundancy for the communication by the application, and determine a smaller value of the redundancy limit and the recommended redundancy as the redundancy of the communication by the application, wherein the processor is further configured to:

specify, based on the correspondence relation, redundancy specifying information corresponding to the communication quality indicator, and determine the recommended redundancy based on the redundancy specifying information.

2. The redundancy control device according to claim 1, wherein:

the application is an application for receiving an input and output request with respect to a predetermined storage connected via the network and executing input and output of data to or from the storage, and the processor is further configured to execute the application and calculate the use-predicted communication bandwidth based on the input and output request.

3. The redundancy control device according to claim 1, wherein:

a communication priority that is a priority of communication for each of a plurality of applications is stored, and the processor is further configured to determine the redundancy limit based on the communication priority.

4. The redundancy control device according to claim 1, wherein:

a minimum redundancy, which is a minimum value of the redundancy of the communication for the application, is stored, and the processor is further configured to set the redundancy of the communication by the application to be equal to or larger than the minimum redundancy.

5. The redundancy control device according to claim 1, wherein the communication quality indicator is a packet loss rate in the network.

6. A redundancy control method, executed by a redundancy control device, for setting a redundancy for a communication system allowing communication via a network according to a set redundancy, the method comprising:

storing a correspondence relation between a communication quality indicator and redundancy specifying information for specifying a redundancy to be set, receiving, from an application, a use-predicted communication bandwidth which is a communication bandwidth predicted to be used in the network, determining a redundancy limit, which is an upper limit of a redundancy in communication by the application, based on a communication bandwidth usable in the network and the use-predicted communication bandwidth, setting a redundancy equal to or less than the determined redundancy limit in the communication system, acquiring a communication quality indicator in the network, determining, based on the communication quality indicator, a recommended redundancy for the communication by the application, determining a smaller value of the redundancy limit and the recommended redundancy as the redundancy of the communication by the application, wherein determining, based on the communication quality indicator, a recommended redundancy comprises:

specifying, based on the correspondence relation, redundancy specifying information corresponding to the acquired communication quality indicator, and determining the recommended redundancy based on the redundancy specifying information.

\*    \*    \*    \*    \*